(12) United States Patent
Ratnakaram et al.

(10) Patent No.: US 11,438,251 B1
(45) Date of Patent: Sep. 6, 2022

(54) SYSTEM AND METHOD FOR AUTOMATIC SELF-RESOLUTION OF AN EXCEPTION ERROR IN A DISTRIBUTED NETWORK

(71) Applicant: Bank of America Corporation, Charlotte, NC (US)

(72) Inventors: Udaya Kumar Raju Ratnakaram, Hyderabad (IN); Amit Mishra, Chennai (IN); Krithika Viswanathan, Chennai (IN); Sarvari Tadimalla, Bhimavaram (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 17/652,846

(22) Filed: Feb. 28, 2022

(51) Int. Cl.
   *G06F 15/173* (2006.01)
   *H04L 43/0823* (2022.01)
   *H04L 41/0654* (2022.01)
   *H04L 41/0631* (2022.01)

(52) U.S. Cl.
   CPC ...... *H04L 43/0823* (2013.01); *H04L 41/0631* (2013.01); *H04L 41/0654* (2013.01)

(58) Field of Classification Search
   CPC ............. H04L 43/0823; H04L 41/0631; H04L 41/0654
   See application file for complete search history.

(56) References Cited

U.S. PATENT DOCUMENTS

| | | | |
|---|---|---|---|
| 6,640,145 B2 | 10/2003 | Hoffberg et al. | |
| 6,732,111 B2 | 5/2004 | Brodersen et al. | |
| 7,076,778 B2 | 7/2006 | Brodersen et al. | |
| 7,685,083 B2 | 3/2010 | Fairweather | |
| 7,702,624 B2 | 4/2010 | King et al. | |
| 8,073,742 B2 | 12/2011 | Caballero et al. | |
| 8,073,777 B2 | 12/2011 | Barry et al. | |
| 8,172,682 B2 | 5/2012 | Acres et al. | |
| 8,209,738 B2 | 6/2012 | Nicol et al. | |
| 8,255,995 B2 | 8/2012 | Kraemer et al. | |
| 8,311,863 B1* | 11/2012 | Kemp | G06Q 10/0639 705/7.29 |
| 8,533,851 B2 | 9/2013 | Ginter et al. | |

(Continued)

FOREIGN PATENT DOCUMENTS

| | | | | |
|---|---|---|---|---|
| BR | 112021011097 A2 | * | 8/2021 | ............. G06N 20/00 |
| CN | 113849330 A | * | 12/2021 | |
| CN | 113923099 A | * | 1/2022 | |

OTHER PUBLICATIONS

Ratnakaram, U. K. R. et al., "System and Method for Detecting Root Cause of an Exception Error in a Task Flow in a Distributed Network," U.S. Appl. No. 17/372,903, filed Jul. 12, 2021, 41 pages.

(Continued)

*Primary Examiner* — Richard G Keehn

(57) ABSTRACT

An exception-resolution monitoring system determines an exception error is detected corresponding to a failed transmission of a message between servers of a distributed network. Changes are monitored that are tested and implemented to correct the detected exception errors. An executable corrective action is determined based on the monitored changes. The executable action is stored for future use and linked to a root cause of the exception error and properties of the distributed network at the time of the exception error.

20 Claims, 9 Drawing Sheets

(56) References Cited

U.S. PATENT DOCUMENTS

| | | |
|---|---|---|
| 8,635,376 B2 | 1/2014 | Barrett et al. |
| 8,713,062 B2 | 4/2014 | Bobick et al. |
| 8,713,631 B1 | 4/2014 | Pavlyushchik |
| 8,788,569 B2 | 7/2014 | Griffiths et al. |
| 8,793,363 B2 | 7/2014 | Sater et al. |
| 8,826,077 B2 | 9/2014 | Bobak et al. |
| 8,843,386 B2 | 9/2014 | Greene et al. |
| 8,904,181 B1 | 12/2014 | Felsher et al. |
| 8,924,269 B2 | 12/2014 | Seubert et al. |
| 8,924,346 B2 | 12/2014 | Colrain et al. |
| 9,154,383 B2 | 10/2015 | Manuel-Devadoss et al. |
| 9,286,471 B2 | 3/2016 | Qureshi et al. |
| 9,294,386 B2 | 3/2016 | Narad |
| 9,298,535 B2 | 3/2016 | Haines |
| 9,477,749 B2 | 10/2016 | Mathew et al. |
| 9,514,387 B2 | 12/2016 | Eaton |
| 9,767,302 B2 | 9/2017 | Lim |
| 9,940,330 B2 | 4/2018 | Le et al. |
| 10,333,798 B2 | 6/2019 | Chan et al. |
| 10,536,356 B2 | 1/2020 | Zhong et al. |
| 10,592,562 B2 | 3/2020 | Pal et al. |
| 10,621,068 B2 | 4/2020 | Kruszewski et al. |
| 10,621,203 B2 | 4/2020 | Hunt et al. |
| 10,681,060 B2 | 6/2020 | Scheidler et al. |
| 10,693,900 B2 | 6/2020 | Zadeh et al. |
| 10,810,071 B2 | 10/2020 | Hu et al. |
| 10,855,712 B2 | 12/2020 | Oliner et al. |
| 2008/0109683 A1* | 5/2008 | Erwin .................. G06F 11/0709 714/E11.029 |
| 2015/0032500 A1 | 1/2015 | Cope et al. |
| 2015/0081559 A1 | 3/2015 | Dua |
| 2015/0106348 A1* | 4/2015 | Kapur .................. G06F 11/3404 707/703 |
| 2015/0106659 A1* | 4/2015 | Kapur .................. G06F 11/3644 714/39 |
| 2015/0193630 A1 | 7/2015 | Von Kaenel et al. |
| 2015/0281287 A1 | 10/2015 | Gill et al. |
| 2015/0339673 A1 | 11/2015 | Adjaoute |
| 2016/0055489 A1 | 2/2016 | Frankland et al. |
| 2016/0140743 A1 | 5/2016 | Neels et al. |
| 2017/0091008 A1 | 3/2017 | Cherbakov et al. |
| 2017/0251985 A1 | 9/2017 | Howard |
| 2018/0089188 A1 | 3/2018 | Kharisma et al. |
| 2018/0246942 A1 | 8/2018 | Chen et al. |
| 2019/0052549 A1 | 2/2019 | Duggal et al. |
| 2020/0201699 A1* | 6/2020 | Yu ....................... G06F 11/0769 |
| 2021/0149788 A1* | 5/2021 | Downie .............. G06F 11/3604 |

OTHER PUBLICATIONS

Ratnakaram, U. K. R. et al., "Self-Resolution of Exception Errors in a Distributed Network," U.S. Appl. No. 17/652,879, filed Feb. 28, 2022, 67 pages.

Ratnakaram, U. K. R. et al., "Developer Test Environment With Containerization of Tightly Coupled Systems," U.S. Appl. No. 17/652,884, filed Feb. 28, 2022, 69 pages.

\* cited by examiner

SYSTEM AND METHOD FOR AUTOMATIC SELF-RESOLUTION OF AN EXCEPTION ERROR IN A DISTRIBUTED NETWORK

TECHNICAL FIELD

The present disclosure relates generally to distributed networks, and more specifically to a system and method for detecting root cause of an exception error in a task flow in a distributed network.

BACKGROUND

System stability testing and diagnosis in a distributed network of computing devices is a challenging problem. Computing devices in a distributed network can fail due to many possible causes. It is challenging to detect a cause of a failure in the distributed network. Currently, in case of a failure, the computing devices in the distributed network undergo manual inspection by operators. This process is time-consuming and error-prone. Current technology is not configured to provide a reliable and efficient solution to detect the root cause of an exception error reported by a device in a distributed network.

SUMMARY

Current technology is not configured to provide a reliable and efficient solution to detect the root cause of an exception error reported by a device in a distributed network. This disclosure contemplates systems and methods for detecting the root cause of an exception error in a task flow in a distributed network.

For example, assume that a user wants to access their account from a web application. To enable the user to access their account, a series of steps may be performed by a series of servers in the distributed network. The distributed network may include a first server that may be configured to verify user login credentials to enable the user to enter their user portal on the web application, a second server that may be configured to retrieve user information to be displayed on the user's portal, a third server that may be configured to store the user information, and other servers. The other servers may perform other steps to enable the user to access their account and view their information. In the distributed network, a plurality of servers may communicate with each other and exchange messages to enable the user to access their account, and view their information. In some cases, a server may not receive a message as expected. For example, assume that a first server may send a message to a second server to retrieve particular user information, e.g., a residential address, a phone number, a document, etc. Also, assume that the second server does not respond to the received message. In this example, the first server reports an exception error because the first server does not receive the requested user information as expected from the second server. The disclosed system is configured to detect the root cause of such exception errors. Accordingly, the disclosed system provides a practical application of detecting the root cause of exception errors in a distributed network.

In one embodiment, the system for detecting a root cause of an exception error in a distributed network comprises a processor and a memory. The processor receives communication data that comprises a plurality of messages being transmitted between a plurality of servers in a distributed network, where the plurality of servers comprises a first server, a second server, and a third server. The processor receives communication acknowledgement data that indicates whether each message from among the plurality of messages is being received by a respective server from among the plurality of servers. The communication acknowledgement data comprises a first acknowledgement data that indicates whether the second server received a first message from the first server, and a second acknowledgement data that indicates whether the second server received a second message from the third server. The processor determines whether each message from among the plurality of messages is received by a respective server from among the plurality of servers based at least in part upon the communication acknowledgement data. The processor determines, from the first acknowledgement data, that the second server has received the first message from the first server. The processor determines, from the second acknowledgement data, that the second server has reported an exception error that indicates that the second server did not receive the second message from the third server, and that the third server did not send the second message to the second server. The processor determines that the third server is associated with the root cause of the exception error in response to determining that the third server did not send the second message to the second server. The memory is operably coupled with the processor. The memory is operable to store the communication data and the communication acknowledgement data.

The disclosed system provides several practical applications and technical advantages, which include: 1) technology that detects a server that reports an exception error by implementing an exception monitoring module in each server from among a plurality of servers in a distributed network, and implementing an exception listener module in a central server that is configured to receive communications exchanged between the plurality of servers; 2) technology that identifies servers that are in direct communication with the server that reported the exception error, e.g., by implementing a multi-layer detection module; 3) technology that determines the health of communications among the servers, i.e., determines whether each message transmitted between each pair of servers is successfully received or failed, e.g., based on acknowledgement messages that indicate whether each message is received or not; 4) technology that generates a communication matrix whose elements indicate successful and failed messages between the servers, where the successful messages are indicated by logic number "1" and the failed messages are indicated by logic number "0"; 5) technology that, using the communication matrix, identifies the earliest failed message based on determining the sequence associated with the messages and the acknowledgement messages exchanged between the servers; 6) and technology that determines that the root cause of the exception error is associated with the server that is associated with the earliest failed message.

As such, the disclosed system may improve the current data processing, distributed system monitoring, and fault detection technologies by detecting a root cause of an exception error in a task flow in a distributed system. Accordingly, the disclosed system may be integrated into a practical application of improving processing and memory storage capacity utilization for detecting the root cause of the exception error that would otherwise be spent using the current technology. For example, by detecting the root cause of the exception error, the disclosed system may report the root cause to an operator, and the root cause that has led to the exception error can be addressed and perhaps resolved.

The disclosed system may further be integrated into an additional practical application of improving the underlying operations of computer systems in the distributed network (e.g., servers, databases, etc.) that are tasked to carry out steps to grant a user request, such as to access an account and retrieve particular information from the account. For example, using the current technology where the root cause of the exception error has remained undetected, the computer systems in the distributed network continue to communicate with other computer systems which lead to more failed messages reported by the computer systems. This leads the processors and memories of the computer systems to have to process multiple failed messages, which leads to reducing the efficiency of utilizing the processing resources and storage capacity of these computer systems. In contrast, upon detecting the earliest failed message, the disclosed system processes the earliest failed message and detects a root cause of the earliest failed message. Upon detecting the earliest failed message, the disclosed system may pause the undergoing task flow, thus, preventing other servers to report failed messages as a consequence of the earliest failed message. Accordingly, the disclosed system improves the processing resources and storage capacity utilization in the computer systems of the distributed network more efficiently.

The disclosed system may further be integrated into an additional practical application of improving network communication between the computer systems of the distributed network. For example, by detecting the root cause of the exception error, and reporting the root cause of the exception error, the root cause can be addressed earlier compared to the current technology, and thus, the network communication bandwidth among the computer systems is not wasted.

Furthermore, current technology is also not configured to provide reliable and efficient system corrections after a root cause of an exception error is determined. This disclosure contemplates systems and methods for automatically identifying a corrective system change for resolving a detected exception error, optionally testing the corrective system change in an improved test environment, and automatically implementing the corrective system change.

Embodiments of this disclosure may be integrated into the practical application of a solution monitoring system which generates an intelligent solution registry that can automatically resolve exception errors with various detected root causes. The solution monitoring system monitors changes that are implemented for various detected root causes and systems. The solution monitoring system intelligently extracts and stores change descriptions in a reusable manner, such that similar exception errors that are detected in the future can be resolved using the same or similar solutions. The solution monitoring system facilitates more rapid and efficient responses to exception errors than was previously possible. For example, responses may be implemented with decreased consumption of computing resources (e.g., memory, processing, and/or networking resources). For instance, a solution or response may be implemented without wasting networking resources to communicate between the different systems used to evaluate, plan, and implement a solution using previous technology. Information obtained by the solution monitoring system may reduce or remove bottlenecks in responding to exception errors, such that there is little or no downtime between when an exception error is detected and a corrective action is taken. The solution monitoring system may also or alternatively prevent unnecessary repeated testing of the same or similar exception errors (e.g., with the same or similar root causes) by efficiently linking, or associating, previously observed exception errors to solutions that are known to be effective.

In certain embodiments, this disclosure is integrated into the practical application of a solution implementation system that automatically implements corrective changes in response to a detected exception error. In certain embodiments, the solution implementation system may leverage the specially configured information determined by the solution monitoring system. When an exception error is detected, the solution implementation system determines system(s) impacted by the root cause of the exception error. A corrective action is determined that is tailored to both the root cause and the impacted system(s). The determined corrective action is then automatically implemented. The solution implementation system provides more reliable, rapid, and efficient resolution of exception errors than was previously possible. For example, corrective actions may be implemented with decreased consumption of computing resources (e.g., memory, processing, and/or networking resources). For instance, rather than relying on human intervention or a one-size-fits-all response, a tailored solution may be implemented without wasting computational resources. The solution implementation system may provide near real-time corrections to exception errors, such that there is little or no downtime between when an exception error is detected and the corrective action is implemented. The solution implementation system may also or alternatively prevent unnecessary repeated testing of the same or similar exception errors (e.g., with the same or similar root causes) by automatically implementing a predetermined corrective action for a given combination of root cause and system configuration.

In certain embodiments, this disclosure is integrated into the practical application of an intelligent test environment for evaluating root causes and/or possible corrective actions for an exception error. A system implementing the test environment detects that an exception error is associated with functions implemented by tightly coupled systems and, in response, converts code for testing the tightly coupled systems to containerized code for separate systems. In this way, the containerized functionality can be separately tested to determine a root cause and/or test potential corrective actions. In certain embodiments, the test environment may include only the systems involved in the communication flow for an exception, such that operation of the test environment consumes fewer computational resources than was previously possible. In some embodiments, the intelligent test environment includes only the minimum components needed for testing, such that tests can be run at near real-time, for example, to further improve operations of the solution monitoring and/or solution implementation systems described in this disclosure. The intelligent test environment of this disclosure may also free up other system resources, such that more tests can be run in parallel to more rapidly and reliably determine root causes and/or test corrective actions.

Certain embodiments of this disclosure may include some, all, or none of these advantages. These advantages and other features will be more clearly understood from the following detailed description taken in conjunction with the accompanying drawings and claims.

In an embodiment, an exception-resolution monitoring system includes a memory and processor communicatively coupled to the memory. The processor determines an exception error is detected corresponding to a failed transmission of a message between communicatively coupled servers of a distributed network. Changes are monitored that are tested and implemented to correct the detected exception errors. For each monitored change, a root cause is determined of the exception error corrected by the change. Properties are determined of the distributed network at the time of the exception error. One or more servers of the distributed network are determined that are impacted by the monitored change. A file location is determined of the one or more servers that are impacted by the monitored change that is altered by the monitored change. A value provided in the determined file location is determined to execute the monitored change. Based at least in part on the determined file location and the determined value, an executable corrective action is determined. The executable action is stored in the memory and linked to the root cause of the exception error and the properties of the distributed network at the time of the exception error.

In another embodiment, a solution implementation system includes a memory configured to store a solution registry with a corrective action for each of a plurality of predefined root causes of exception errors. A processor is communicatively coupled to the memory. The processor receives communication data transmitted through a distributed network comprising a plurality of servers. An exception error is detected corresponding to a failed transmission of the communication data between communicatively coupled servers of the distributed network. A first root cause of the exception error is determined. The first root cause is associated with a first server of the plurality of servers of the distributed network. The first server failed to relay the communication data to another server in the distributed network. Properties of the distributed network at the time of the detected exception error are determined. Using the solution registry, a first corrective action is determined for the first root cause that is associated with the determined properties of the distributed network at the time of the detected exception error. The first corrective action is automatically implemented at the first server.

In yet another embodiment, a system includes a distributed network includes a plurality of servers. Operations of a first server and a second server of the distributed network are tightly coupled. An exception resolution system includes a processor that determines that an exception error is detected in the distributed network. The exception error corresponds to a failed transmission of communication data between communicatively coupled servers of the distributed network. A data transfer route is determined associated with failed transmission of the communication data. The data transfer route includes the servers of the distributed network that fail to transmit or receive the communication data as a result of the exception error. The tightly coupled first server and second server are determined to be included in the shortest data transfer route. A subset of components of the tightly coupled first server and second server is determined that are involved in operations associated with the exception error. Based on the data transfer route and the subset of components, a containerized test environment is generated with replica components corresponding to (1) the servers included in the data transfer route other than the first and second servers and (2) the subset of the components of the tightly coupled first and second servers that are involved in operations associated with the exception error. A change is provided to a property of a first replica component of the containerized test environment. The property of the first replica component corresponds to a data transfer configuration property of the first server. Based on results provided by the containerized test environment, it is determined that the provided change resolves the exception error.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect a root cause of an exception error in a task flow in a distributed network. This disclosure provides various systems and methods to detect a root cause of an exception error in a task flow in a distributed network. In one embodiment, system 100 to detect a root cause of an exception error in a task flow in a distributed network are described in FIG. 1. In one embodiment, operational flow 200 of the system 100 to detect a root cause of an exception error in a task flow in a distributed network are described in FIG. 2. In one embodiment, method 300 to detect a root cause of an exception error in a task flow in a distributed network are described in FIG. 3.

As also described above, previous technologies also fail to provide efficient and reliable solutions for correcting exception errors. In certain embodiments, this disclosure is integrated into the practical application of a solution monitoring system that tracks the types of actions taken to correct exception errors (e.g., over a training time period) and generates an intelligent solution registry that can be used to automatically resolve future exception errors, resulting in improved use of computational resources to generate solutions to exception errors, as described with respect to FIGS. 4 and 5 below. In certain embodiments, this disclosure is integrated into the practical application of a solution implementation system that automatically implements corrective changes in response to a detected exception error, resulting in much faster correction of exception errors and improved use of computational resources to implement these corrections, as described with respect to FIGS. 6 and 7 below. In certain embodiments, this disclosure is integrated into the practical application of an improved test environment for evaluating root causes and/or possible corrective actions for an exception error that employs a containerization-based approach that is more efficient and reliable than was previously available, as described with respect to FIGS. 8 and 9 below.

Figure 1:
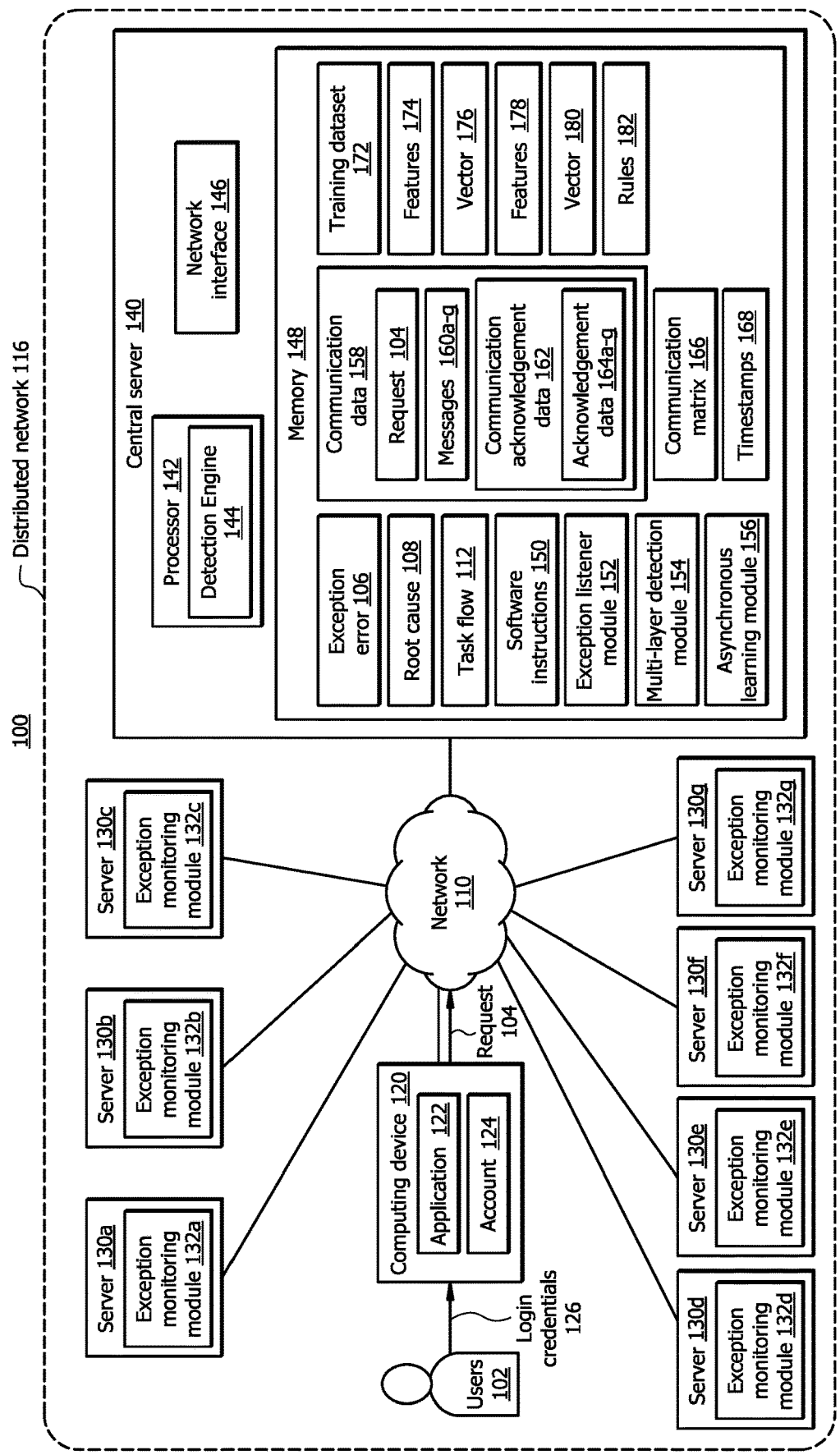
FIG. 1 is a diagram illustrating an embodiment of a system configured to detect a root cause of an exception error in a task flow in a distributed network.

Example System for Detecting a Root Cause of an Exception Error in a Task Flow in a Distributed Network FIG. 1 illustrates one embodiment of a system 100 that is configured for detecting a root cause 108 of an exception error 106 in a task flow 112 in a distributed network 116. In one embodiment, system 100 comprises a central server 140. In some embodiments, system 100 further comprises a network 110, computing device 120, and one or more servers 130. Network 110 enables the communication between components of the system 100. Central server 140 comprises a processor 142 in signal communication with a memory 148. Memory 148 stores software instructions 150 that when executed by the processor 142, cause the processor 142 to execute one or more functions described herein. For example, when the software instructions 150 are executed, the processor 142 executes a detection engine 144 to detect an exception error 106 in a task flow 112, and detect a root cause 108 of the exception error 106. In other embodiments, system 100 may not have all of the components listed and/or may have other elements instead of, or in addition to, those listed above.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

Application 122 can be accessed from the computing device 12. The computing device 120 stores and/or comprises the application 122. The application 122 may be a software, mobile, or web application 122. The user 120 can access the application 122 from a screen of the computing device 120. For example, the application 122 may be associated with an organization that provides services and/or products to users 102. The user 102 may use the application 122 to log into their account 124, access their account 124, view their account information, etc.

The process of enabling the user 102 to access and/or view their account information may be referred to as the task flow 112. To enable the user 102 to access their account 124, one or more steps may be performed by one or more servers 130 in the distributed network 116. This process is described further below in conjunction with the operational flow 200 described in FIG. 2.

Each of the servers 130a to 130g is generally any device that is configured to process data and/or store data used by one or more components of the system 100. Each of the servers 130a to 130g may be a different server 130. In some examples, each of the servers 130a to 130g may include a computer system, such as a desktop computer, a workstation, a computing system, and/or the like. In some examples, each of the servers 130a to 130g may include a database or a storage architecture, such as a network-attached storage cloud, a storage area network, a storage assembly, computer storage disk, computer memory unit, computer-readable non-transitory storage media directly (or indirectly) coupled to one or more components of the system 100. The servers 130a-g may form a distributed network or network 116. Other servers 130 may be included in the distributed network 116.

Each of the servers 130a to 130g may include a user interface, such as a display, a microphone, keypad, or other appropriate terminal equipment usable by a user. Each of the servers 130a to 130g may include a hardware processor, memory, and/or circuitry configured to perform any of the functions or actions of each of the servers 130a to 130g described herein. For example, a different software application designed using software code may be stored in the memory and executed by the processor to perform the functions of each of the servers 130a to 130g.

In a complex task flow 112, various messages may be exchanged among the servers 130. To monitor the messages (i.e., communications) transmitted among the servers 130, an exception monitoring module 132 may be installed in each of the servers 130a to 130g. Thus, the communications transmitted among the servers 130 are monitored by exception monitoring modules 132.

The exception monitoring module 132 installed in a particular server 130 may be implemented by a processor of the particular server 130 executing software instructions stored in a memory of the particular server 130. The exception monitoring module 132 is configured to monitor the incoming and outgoing communications of the server 130. The exception monitoring modules 132a to 132g are instances of the exception monitoring module 132.

In the example of FIG. 1, the exception monitoring module 132a is installed in the server 130a, exception monitoring module 132b is installed in the server 132b, exception monitoring module 132c is installed in the server 132c, exception monitoring module 132d is installed in the server 132d, exception monitoring module 132e is installed in the server 132e, the exception monitoring module 132f is installed in the server 130f, and exception monitoring module 132g is installed in the server 132g. The distributed network 116 may include other servers 130. Thus, any number of servers 130 may include exception monitoring modules 132 in the distributed network 116.

In an example operation, assume that the user 102 wants to access their account 124. To this end, the user 102 may input their login credentials 126 in the application 122. In response, the application 122 sends a request 104 to the server 130a to verify the login credentials 126. The server 130a may include a middleware system that is configured to verify the login credentials 126. The server 130a may verify the login credentials 126 by determining whether the login credentials 126 match login credentials previously set by the user 102, and stored in a memory of the server 130a. In response to verifying the login credentials 126, the server 130*a* sends a first message 160 to the server 130*b* that indicates the login credentials 126 are valid.

In response to receiving the first message 160, the server 130*b* may allow the user 102 to enter their account portal on the application 122. The server 130*b* may include a User Interface (UI) application module that allows the user 102 to enter their account portal on the application 122. Now that the user 102 has been allowed to log into their account 124, assume that the user 102 wants to view particular account information, such as a file that they stored in their account 124 last month, residential address, phone number, and/or any other user information available on the account 124. To this end, the server 130*b* sends a second message 160 to the server 130*c* to retrieve the requested user information from servers 130*d* and 130*e*.

In response, the server 130*c* sends a third message 160 to the servers 130*d* and 130*e* to retrieve the requested user information. The server 130*c* may include a middleware system that is configured to retrieve user information from one or more servers 130. The server 130*d* may include a database that is configured to store a first set of user information. Similarly, server 130*e* may include a database that is configured to store a second set of user information.

At every step in this process, the exception monitoring modules 132*a* to 132*e* monitor and record the messages 160 being exchanged between the servers 130*a* to 130*e*. The exception monitoring modules 132*a* to 132*e* forward the recorded messages 160 to the exception listener module 152 that is stored in the memory 148 of central server 140. In some embodiments, the exception monitoring modules 132*a* to 132*e* may forward the messages 160 to the central server 140 in real-time, periodically (e.g., every minute, every two minutes, etc.), and/or on-demand.

Assume that the third message 160 is not received successfully by the server 130*d*. Thus, the server 130*d* reports an exception error 106 that indicates the third message 160 is not received. Thus, the detection engine 144 is triggered to detect the root cause 108 of the exception error 106. The detection engine 144 uses the communication data 158 that includes the request 104 and messages 160 to detect the root cause 108 of the exception error 106. This process is described in detail in conjunction with the operational flow 200 described in FIG. 2.

Central Server

Central server 140 is generally a server or any other device configured to process data and communicate with computing devices (e.g., computing device 120 and servers 130), databases, etc., via the network 110. The central server 140 is generally configured to oversee the operations of the detection engine 144, as described further below in conjunction with the operational flow 200 of system 100 described in FIG. 2. Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the detection engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Network interface 146 is configured to enable wired and/or wireless communications (e.g., via network 110). The network interface 146 is configured to communicate data between the server 140 and other devices (e.g., computing device 120 and servers 130), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, exception listener module 152, multi-layer detection module 154, asynchronous learning module 156, communication data 158, exception error 106, root cause 108 (of the exception error 106), task flow 112, communication matrix 166, timestamps 168, training dataset 172, features 174, features 178, vector 176, vector 180, and/or any other data or instructions. The software instructions 150 may comprise any suitable set of instructions, logic, rules, or code operable to execute the processor 142.

Detection Engine

Detection engine 144 may be implemented by the processor 142 executing the software instructions 150, and is generally configured to detect a root cause 108 of an exception error 106 in a task flow 112 in the distributed network 116.

In one embodiment, the detection engine 144 detects the root cause 108 of an exception error 106 in a task flow 112 by executing the exception listener module 152 and multi-layer detection module 154.

In one embodiment, the detection engine 144 detects the root cause 108 of an exception error 106 in a task flow 112 by executing the asynchronous learning module 156.

The operations of the detection engine 144 is described below in conjunction with the operational flow 200 of the system 100 described in FIG. 1.

Figure 2:
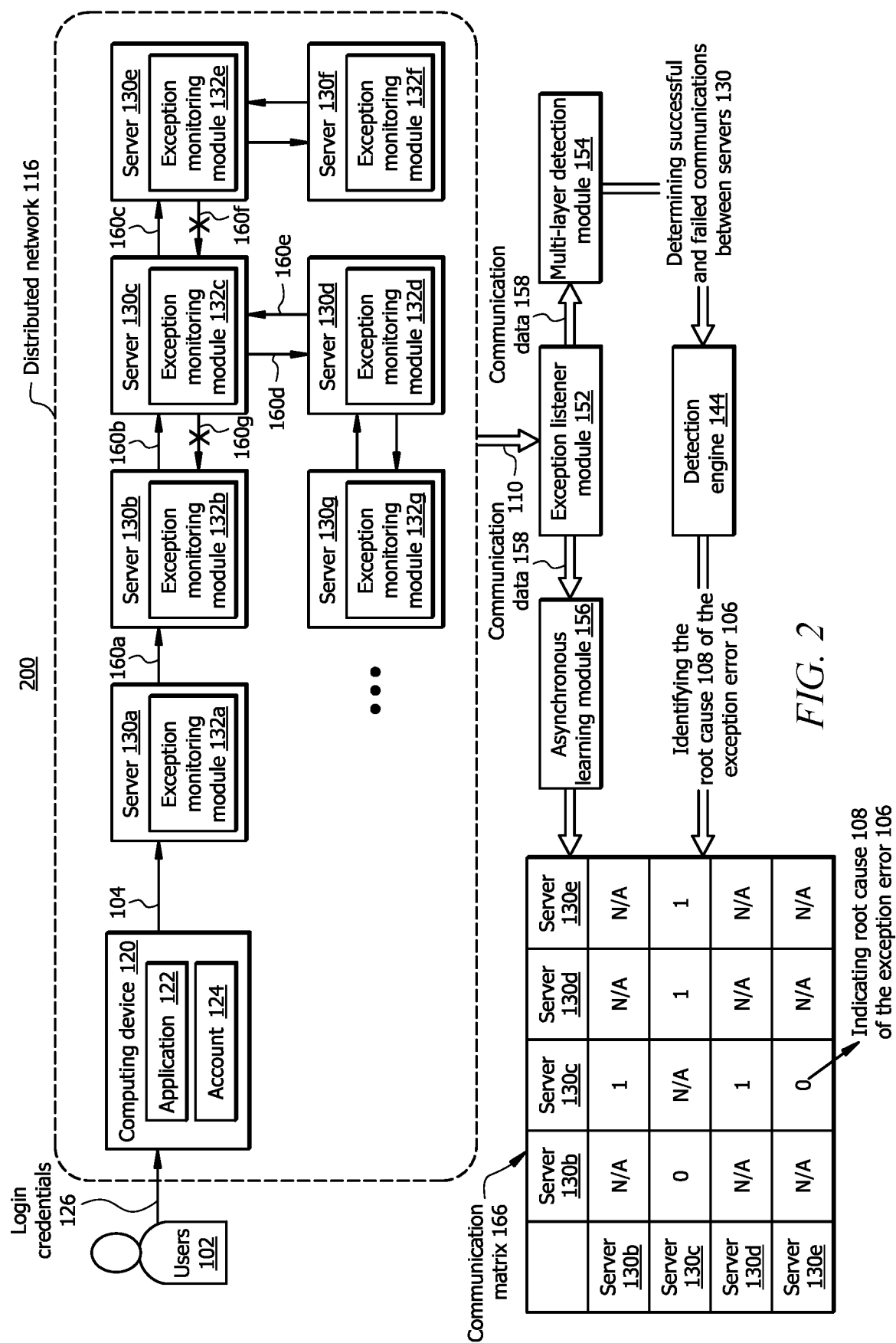
FIG. 2 is a flow diagram illustrating an example operational flow of the system of FIG. 1 to detect a root cause of an exception error in a task flow in a distributed network.

Example Operational Flow for Detecting a Root Cause of an Exception Error in a Task Flow FIG. 2 illustrates an example operational flow 200 of system 100 of FIG. 1 for detecting a root cause 108 of an exception error 106 in a task flow 112.

In one embodiment, the operational flow 200 begins when the user 102 requests to login to their account 124, access their account 124, perform an action on their account 124, or any other task on the application 122. To enable the user 102 to perform a task on the application 122, one or more steps may be performed by one or more servers 130 in the distributed network 116.

In the example of FIG. 2, assume that the task is to allow the user 102 to login to their account 124, and access a particular data associated with the account 124. The one or more steps that the servers 130 perform to enable the user 102 to login to their account 124, and access the particular data may be referred to as the task flow 112. In the example of FIG. 2, the task flow 112 is to enable the user 102 to login to their account 124, and access the particular data. In another example, the task flow 112 may be to enable the user 102 to perform any task on the application 122.

The user 102 inputs their login credential 126 to the application 122 similar to that described in FIG. 1. In response to receiving the login credentials 126, the application 122 sends the request 104 to the server 130a to verify the login credentials 126 of the user 102. If the server 130a verifies the login credentials 126 (similar to that described in FIG. 1), the server 130a sends the message 160a to the server 130b to allow the user 102 to log into the their account 124, similar to that described in FIG. 1. For example, the user 102 may be able to access their account portal on the application 122, and view their account 124 on the screen of the computing device 120. For example, assume that the user 102 wants to access particular information from their account 124, such as a file that they stored in their account 124 last month, residential address, phone number, and/or any other user information available on the account 124. To this end, the server 130b sends a message 160b to the server 130c to retrieve the requested user information from servers 130e and 130d, assuming that a first set of requested user information is stored in server 130e, and a second set of requested user information is stored in server 130d. In response, the server 130c sends a message 160c to the server 130e, and a message 160d to the server 130d to retrieve the requested user information. Assume that the server 130c retrieves the second set of requested information from the server 130d in a message 160e. Also, assume that the server 130c does not receive the first set of requested information from the server 130e. For example, assume that the server 130c does not receive the message 160f from the server 130e. Consequently, server 130c does not send a message 160g to the server 130b, because the server 130c did not receive the requested information from the server 130e. In parallel or in sequence, to enable the user 102 to retrieve the particular data from their account 124, any combination of servers 130 may communicate messages 160 to one another. For example, server 130f and 130g may send and receive messages 160 to and from servers 130e and 130d, respectively.

Accessing Communication Data Communicated Among the Servers

As described in FIG. 1, each of the servers 130a to 130g stores or associated with an instance of the exception monitoring module 132. Each exception monitoring module 132 forwards incoming and outgoing messages 160 with respect to its corresponding server 130 to the exception listener module 152 via the network 110.

In the example of FIG. 2, the exception monitoring module 132a forwards the message 160a, the exception monitoring module 132b forwards the message 160b, the exception monitoring module 132c forwards the messages 160b and 160c, the exception monitoring module 132d forwards the messages 160d and 160e, the exception monitoring module 132e forwards the message 160c to the exception listener module 152.

Each exception monitoring module 132 also forwards acknowledgement data 164 to the exception monitoring module 152. Each acknowledgement data 164 indicates whether a server 130 received a message 160 from another server 130. In the example of FIG. 2, the server 130c sends a first acknowledgement data 164a (see FIG. 1) that indicates the server 130c received the message 160b from the server 130d, and sends a second acknowledgement data 164b (see FIG. 1) that indicates the server 130c did not receive the message 160f from server 130e to the originating server 130 and/or the central server 140. Each of the other servers 130 may send other acknowledgement data 164 (e.g., acknowledgement data 164c-g) to a corresponding originating server 130 (that sends a message 160) and/or the central server 140.

In the example of FIG. 2, since the server 130c did not receive any message 160 from the server 130e as expected, the server 130c reports the exception error 106. The exception monitoring module 132c detects the exception error 106, and forwards it to the exception listener module 152. In this manner, the exception monitoring modules 132a to 132g send the messages 160a-g, the communication acknowledgement data 162, and the request 104 to the exception listener module 152.

The communication acknowledgement data 162 includes the acknowledgement data 164a-g. Each of the acknowledgement data 164a-g may be represented by a login number "1" or "0." The exception listener module 152 and/or the detection engine 144 stores the messages 160a-g, the communication acknowledgement data 162, and the request 104 in the communication data 158.

Determining Whether an Exception Error is Reported by a Server

The exception listener module 152 may include code that is configured to collect the communication data 158 and/or any other data, and determine whether an exception error 108 is included in the communication data 158 based on the communication acknowledgement data 162. The detection engine 144 executes the exception listener module 152 by executing the software instructions 150.

The exception listener module 152 forwards the communication data 158 to the multi-layer detection module 154 and the asynchronous learning module 156. The process of detecting the root cause 108 of the exception error 106 by the asynchronous learning module 156 is described further below.

The detection engine 144 executes the multi-layer detection module 154 by executing the software instructions 150. The multi-layer detection module 154 includes code that is configured to 1) identify servers 130 that are interacting with the server 130c that reported the exception error 106; and 2) determine the health of the communications among the server 130c and the surrounding servers 130 that the server 130c (that reported the exception error 106) is interacting, as described below.

In the example of FIG. 2, the multi-layer detection module 154 identifies that the server 130c has reported the exception error 106, and the server 130c is interacting with the servers 130b, 130d, and 130e. The multi-layer detection module 154 determines the health of the communication among the server 130c and its surrounding servers 130b, 130d, and 130e. To this end, the multi-layer detection module 154 executes query statements to identify successful and failed communication (or messages 160) among the servers 130c, 130b, 130d, and 130e.

For example, to identify the successful communications between the server 130c and 130b, the multi-layer detection module 154 searches logs that comprise the communication data 158, messages 160 and acknowledgment data 162 exchanged between the server 130c and 130b. For example, to determine whether communications from the server 130b to 130c are successful, the multi-layer detection module 154 executes a query statement, such as "search from logs where server="server 130b" && matchstring="server 130b to server 130c integration success." Since in the example of FIG. 2, the message 160b from the server 130b to 130c is received (as indicated in the communication acknowledgement data 162), the result of this query statement is indicated by login "1" or "true." In other words, the result of this query statement and/or corresponding acknowledgement data 164 indicates that the message 160b was successfully received by the server 130c.

In another example, to determine whether communications from the server 130c to 130b are successful, the multi-layer detection module 154 executes a query statement, such as "search from logs where server="server 130b" && matchstring="server 130c to server 130b integration success." Since in the example of FIG. 2, the communication from the server 130c to 130b is not received (as indicated in the communication acknowledgement data 162), the result of this query statement is indicated by login "0" or "false." In other words, the result of this query statement and/or corresponding acknowledgement data 164 indicates that the message 160g was never sent by the server 130c.

In another example, to determine whether communications from the server 130e to and 130c are successful, the multi-layer detection module 154 executes a query statement, such as "search from logs where server="server 130e" && matchstring="server 130e to server 130c integration success." Since in the example of FIG. 2, the communication from the server 130e to 130c is not received (as indicated in the communication acknowledgement data 162), the result of this query statement is indicated by login "0" or "false." In other words, the result of this query statement and/or corresponding acknowledgement data 164 indicates that the message 160f was never sent by the server 130e.

In a similar manner, the multi-layer detection module 154 identifies successful and failed communications among the servers 130a-g.

Generating a Communication Matrix

The multi-layer detection module 154 forwards this information, i.e., result of the query statements to the detection engine 144. The detection engine 144 generates the communication matrix 166 using the received data from the multi-layer detection module 152.

The communication matrix 166 includes indications that specify the successful and failed communications among the servers 130. In the communication matrix 166, "1" indicates a successful communication, "0" indicates a failed communication, and "NA" indicates Non-Applicable communication.

In the example of the first row of the communication matrix 166, the first row indicates the communications from the server 130b to servers 130c to 130e. The first row of the communication matrix 166 indicates that the server 130b sends a message 160 to the server 130c successfully, as indicated by "1." In the example of the second row of the communication matrix 166, the second row indicates that the server 130c did not send a message 160 to the server 130b (as indicated by "0") and that the server 130c sent messages 160 to the servers 130d and 130e (as indicated by "1"). In other words, the second row indicates that the communication from the server 130c to server 130b failed. In the example of the third row of the communication matrix 166, the third row indicates that the server 130d sends a message 160 to the server 130c successfully, as indicated by "1." In the example of the fourth row of the communication matrix 166, the fourth row indicates that the communication from the server 130e to the server 130c failed, as indicated by "0."

The detection engine 144 determines a timestamp 168 associated with each communication including messages 160 and communication acknowledgement data 162 transmitted between the servers 130. The detection engine 144 determines, from the communication matrix 166 and the timestamps 168 of the messages 160 and communication acknowledgement data 162, the sequence and order of the communications transmitted between the server 130.

In the example of FIG. 2, the detection engine 144 determines that the server 130c is supposed to receive the message 160f from the server 130e, before sending the message 160g to the server 130b. In other words, the detection engine 144 determines that the timestamps 168 of failed communications (as indicated by "0" in the communication matrix 166), and determines that the first timestamp 168 of the failed communication from the server 130e to server 130c is before (or recorded before) the second timestamp 168 of the failed communication from the server 130c to server 130b.

Identifying the Root Cause of the Exception Error

The detection engine 144 determines the root cause 108 of the exception error 106 by identifying the earliest failed communication (or failed message 160) and its originating server 130. To this end, the detection engine 144 may be implemented by an object-oriented programming language, and treat each element of the communication matrix 166 as an object. The detection engine 144 may also treat each element of the communication data 158 and timestamps 168 as objects. The detection engine 144 determines the correlations and associations between the elements of the communication matrix 166, communication data 158, and timestamps 168. The detection engine 144 uses this information to identify the root cause 108 of the exception error 106.

In the example of FIG. 2, the detection engine 144 determines that communications that were supposed to originate from servers 130c and 130e failed. Based on the timestamps 168 of the communications between the servers 130 and the communication matrix 166, the detection engine 144 determines that the communication that was supposed to originate from the server 130e failed before the communication originated from the server 130c. In this example, the detection engine 144 determines that the server 130c is not a root cause 108 of the exception error 106, for example, because the communications between the server 130c and server 130d are successful as indicated by "1" in the communication matrix 166, and there is at least one communication (i.e., from the server 130e to server 130c) that failed before the communication between the server 130c and server 130b.

The detection engine 144 determines that the root cause 108 of the exception error 108 is the server 130e because the failed communication that was supposed to originate from the server 130e is the earliest failed communication, and has led to failure in one or more communications or failures in delivering messages 160.

In the example of FIG. 2, the detection engine 144 determines that the root cause 108 of the exception error 108 is the server 130e even though the server 130c reported the exception error 108.

The detection engine 144 may determine that the server 130e is the root cause 108 of the exception error 108, due to a failure in the server 130e, the server 130e being shut down, an error in network communication between the server 130e and other servers 130, etc.

In one embodiment, the server 130b may also report a second exception error 108 because the server 130b did not receive the message 160g as expected according to the example task flow 112 of the operational flow 200. Thus, the detection engine 144, exception listener module 152, and/or the multi-layer detection module 154 may detect the second exception error 108 in addition to the first exception error 108 described above. The detection engine 144 may determine that the cause of the server 130b reporting the second exception error 108 is that the server 130c did not send the message 160g to the server 130d. The detection engine 144 may determine, based on the communication matrix 166, communication data 158, and timestamps 168, that the second exception error 108 is reported after the first exception error 108. Thus, the root cause 108 of the first exception error 108 is the same root cause 108 of the second exception error 108.

In one example, an exception error 106 may be due to a server 130 not sending a message 160 as expected according to the task flow 112, e.g., because of a failure in the sending server 130. In another example, an exception error 106 may be due to a server 130 not receiving a message 160 as expected according to the task flow 112, e.g., because of a failure in the receiving server 130. In another example, an exception error 106 may be due to a failure in network communication between servers 130. In the example of FIG. 2, the detection engine 144 may determine that the network communication between the servers 130b, 130c, 130d, 130e, and 130f is operational because these servers 130b-f can transmit other messages 160, e.g., 160b, 160c, 160d, and 160e to one another.

In this manner, the detection engine 144 may be configured to detect the root cause 108 of a chain or series of related exception errors 106.

Identifying the Root Cause of the Exception Error Based on a Pattern of the Communication Matrix As described above, the exception listener module 152 forwards the communication data 158 to the asynchronous learning module 156. The detection engine 144 may execute the asynchronous learning module 156 to learn the pattern of the communication data 158, as described below.

The detection engine 144 may execute the asynchronous learning module 156 by executing the software instructions 150. The detection engine 144 may execute the asynchronous learning module 156 in parallel or after one or more other software modules described above, e.g., multi-layer detection module 154. The asynchronous learning module 156 may be implemented by a machine learning algorithm. For example, the asynchronous learning module 156 may comprise support vector machine, neural network, random forest, k-means clustering, etc. The asynchronous learning module 156 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the asynchronous learning module 156 may be implemented by Natural Language Processing (NLP). In another example, the asynchronous learning module 156 may be implemented by data feed processing, where the data may be in a form of text, code, among others. The detection engine 144 and/or the asynchronous learning module 156 uses the generated communication matrix 166, communication data 158, and timestamps 168 as a training dataset 172.

In a training process, the detection engine 144 and/or the asynchronous learning module 156 may feed the communication matrix 166, communication data 158, and timestamps 168 to an NLP algorithm to determine the associations and correlations between the components of the communication matrix 166, communication data 158, and timestamps 168. In this operation, the detection engine 144 and/or the asynchronous learning module 156 extract features 174 of the communication matrix 166, communication data 158, and timestamps 168. The features 174 may be represented by a vector 176 that comprises a set of numerical values.

The detection engine 144 and/or the asynchronous learning module 156 uses the features 174 and vector 176 to predict a root cause 108 of another exception error 106 that is reported by a server 130 during another task flow 112. For example, assume that the same or another user 102 wants to access their account 124 at another time. A similar process as described above with respect to performing one or more steps is carried out by the servers 130, and the exception monitoring modules 132 forward a second set of communication data 158 to the exception listener module 152. Also assume that a second exception error 108 is reported by a server 130, as indicated in the second set of communication data 158.

The detection engine 144 and/or the asynchronous learning module 156 extract features 178 from the second set of communication data 158, timestamps 168 associated with the second set of communication data 158. The features 178 may be represented by a vector 180 that comprises a set of numerical values.

The detection engine 144 and/or the asynchronous learning module 156 compares the vector 176 (from the training dataset 172) with the vector 180. In this process, the detection engine 144 and/or the asynchronous learning module 156 compares the reference data (i.e., vector 180 that represents the first set of communication data 158, timestamps 168, and communication matrix 166) labelled with the root cause 108 and exception error 106 with the incoming data (i.e., vector 176 that represents the second set of communication data 158 and timestamps 168) that is not labelled with a root cause 108 or an exception error 106.

In comparing the vector 176 with vector 180, the detection engine 144 and/or the asynchronous learning module 156 determines a similarity score between these vectors 176 and 180. For example, to determine the similarity score between the vectors 176 and 180, the detection engine 144 and/or the asynchronous learning module 156 may calculate a dot product of the vectors 176 and 180, calculate a Euclidean distance between the vectors 176 and 180, and/or the like.

The detection engine 144 and/or the asynchronous learning module 156 determines that the vector 176 corresponds to the vector 180 if more than a threshold number of numerical values of the vector 176 (e.g., more than 80%, 85%, etc.) is within a threshold range (e.g., ±5%, ±10%, etc.) of counterpart numerical values of the vector 180, and thus, the similarity score between the vectors 176 and 180 is more than a threshold percentage (e.g., more than 80%, 85%, etc.). If the detection engine 144 and/or the asynchronous learning module 156 determines that the vector 176 corresponds to the vector 180, the detection engine 144 and/or the asynchronous learning module 156 predicts that the root cause 108 of the second exception error 106 is the same root cause 108 that is indicated in the reference data, i.e., training dataset 172, as identified in the example operational flow 200. Otherwise, the detection engine 144 may determine the root cause 108 of the second exception error 106 by implementing the multi-layer detection module 154, and generating a second communication matrix 166, similar to that described above.

In this manner, the detection engine 144 and/or the asynchronous learning module 156 may add different scenarios of different task flows 112, different communication data 158, and timestamps 168 to the training dataset 172 and grow the training dataset 172.

In a testing process, the detection engine 144 and/or the asynchronous learning module 156 may be given a new set of communication data 158 and asked to predict whether an exception error 106 is indicated in the new set of communication data 158, and if so, predict the root cause 108 of the exception error 106.

The detection engine 144 and/or the asynchronous learning module 156 may feed the new set of communication data 158 and its timestamps 168 to the NLP algorithm, extract its features, and produce a vector that represents the features.

The detection engine 144 and/or the asynchronous learning module 156 may perform vector comparison between the newly produced vector and each of the vectors associated with the reference data stored in the training dataset 172, similar to that described above.

The detection engine 144 and/or the asynchronous learning module 156 determines that the root cause 108 of the exception error 106 is the same as the root cause 108 associated with a particular reference data in the training dataset 172, if the detection engine 144 and/or the asynchronous learning module 156 determines the vector similarity score between their vectors is more than a threshold percentage, e.g., more than 80%, 85%, etc.

In another embodiment, the detection engine 144 and/or the asynchronous learning module 156 may identify a root cause 108 of an exception error 106 based on a set of rules 182 that the detection engine 144 and/or the asynchronous learning module 156 generates during generating the communication matrix 166 and identifying the root cause 108 of the exception error 106.

The rules 182 may indicate to identify the failed communications between the servers 130, determine timestamps 168 of the failed communications, and identify that the root cause 108 of the exception error 106 is the originating server 130 associated with the earliest failed communication (e.g., failed message 160) recorded by an exception monitoring module 132.

In this rule-based approach, each of the components of the reference data (e.g., the training dataset 172, historical communication data 158, historical timestamps 168, and other historical data) and the incoming data (i.e., communication data 158, timestamps 168, and other new data) is treated as an object. The detection engine 144 and/or the asynchronous learning module 156 may then compare a value or content of each of the components of the reference data with a counterpart element of the incoming data.

The detection engine 144 and/or the asynchronous learning module 156 may identify that the new root cause 108 of the new exception error 106 is the same as the root cause 108 of the exception error 106 that is indicated in the training dataset 172 if more than a threshold number of elements of the reference data (i.e., the training dataset 172) is the same or within the threshold range of the counterpart element of the incoming data (i.e., communication data 158, timestamps 168, etc.).

In one embodiment, the detection engine 144, upon receiving the exception error 106 and detecting the earliest failed message 160, may pause the undergoing task flow 112, thus, preventing other servers 130 to report failed messages 160 as a consequence of the earliest failed message 160.

In one embodiment, the detection engine 144, upon receiving the first exception error 106 and detecting the earliest failed message 160, may allow the undergoing task flow 112 to continue, and in case another exception error 106 is reported by the same or another server 130, determine the correlation between two or more exception errors 106 and failed messages 160 by processing the communication data 158, timestamps 168, and communication matrix 166, similar to that described above.

Figure 3:
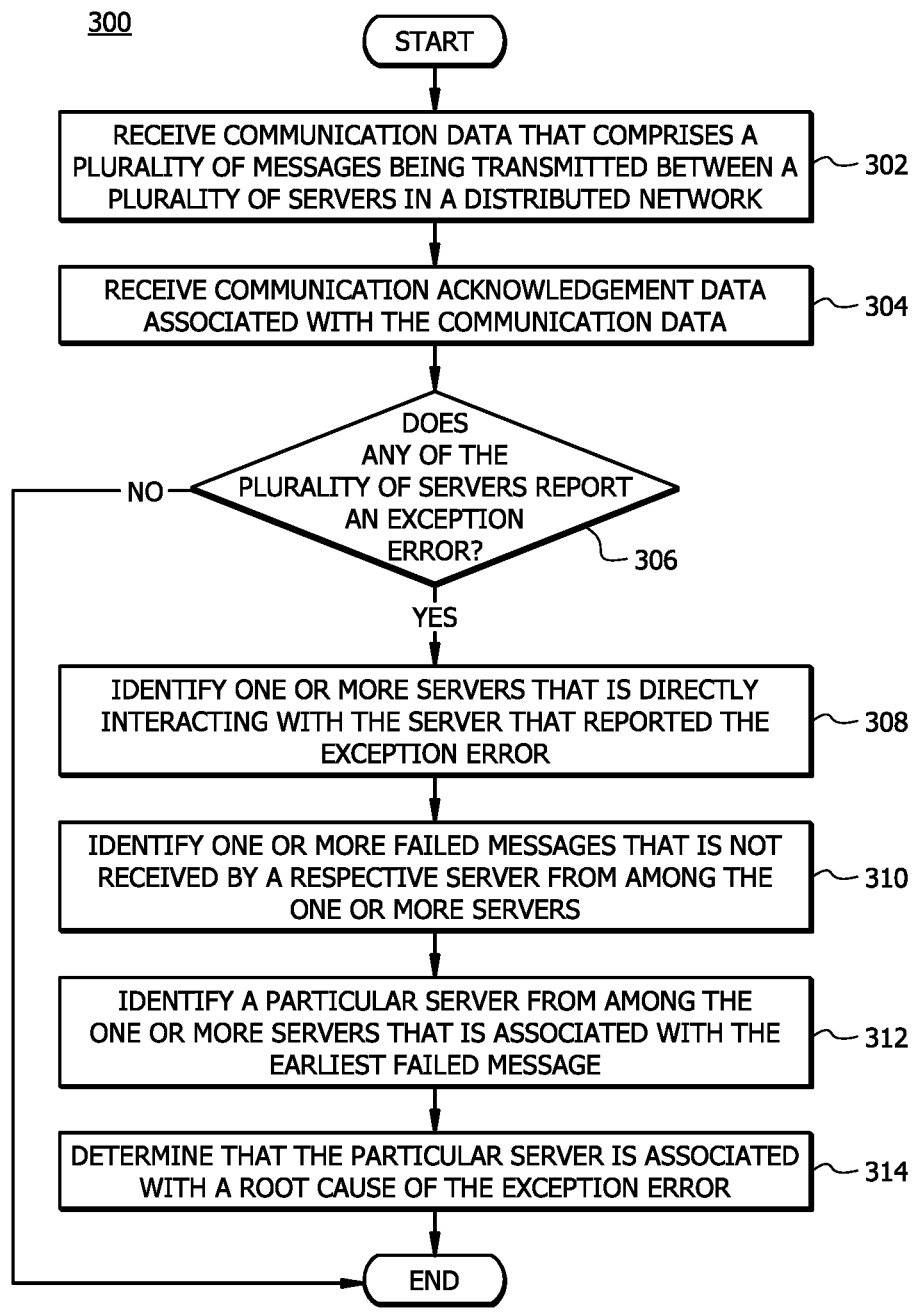
FIG. 3 is a flowchart illustrating an example method for detecting a root cause of an exception error in a task flow in a distributed network.

Example Method for Detecting a Root Cause of an Exception Error in a Task Flow in a Distributed Network FIG. 3 illustrates an example flowchart of a method 300 for detecting a root cause 108 of an exception error 106 in a task flow 112 in a distributed network 116. Modifications, additions, or omissions may be made to method 300. Method 300 may include more, fewer, or other steps. For example, steps may be performed in parallel or in any suitable order. While at times discussed as the system 100, processor 142, detection engine 144, exception listener module 152, multi-layer detection module 154, asynchronous learning module 156, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-314.

The method 300 begins at step 302 where the detection engine 144 (e.g., via the exception listener module 152) receives the communication data 158 that comprises a plurality of messages 160 that are being transmitted between a plurality of servers 130 in a distributed network 116. For example, the exception listener module 152 may receive the communication data 158 from the exception monitoring modules 132 that are installed and stored in the plurality of servers 130, similar to that described in FIGS. 1 and 2. The detection engine 144 may receive the communication data 158 in real-time, periodically (e.g., every five seconds, every minute, every two minutes, etc.), and/or on-demand (e.g., triggered when receipt of a request 104 is detected). The communication data 152 may include a user request 104 to perform a task, such as accessing an account 124, and messages 160 to perform a task flow 112 to accomplish the task by the servers 130. The detection engine 144 may execute the exception listener module 152 to receive the communication data 158.

At step 304, the exception listener module 152 receives communication acknowledgement data 162 that is associated with the communication data 158. In one example, the exception listener module 152 may receive the communication acknowledgement data 162 in parallel with the communication data 152. Thus, the communication data 158 may further include the communication acknowledgement data 162. The communication acknowledgement data 162 may include acknowledgement data 164 that indicates whether each message 160 is being received by a respective server 130, similar to that described in FIGS. 1 and 2.

At step 306, the detection engine 144 (e.g., via the exception listener module 152 and/or the multi-layer detection module 154) determines whether any server 130 from among the plurality of servers 130 reports an exception error 106. In this process, the detection engine 144 (e.g., via the exception listener module 152 and/or the multi-layer detection module 154) determines whether each message 160 is received by a respective server 130 based on the communication acknowledgement data 162. For example, the exception listener module 152 may determine that a server 130 reported an exception error 106 in response to determining that the acknowledgement data 164 indicates that a first server 130 did not receive a particular message 160 from a second server 130, and that the second server 130 did not send the particular message 160. In this example, the exception listener module 152 determines that the server 130 reported the exception error 106 because the server 130 did not receive a message 160 as expected according to the task flow 112, similar to that described in FIGS. 1 and 2. For example, the detection engine 144 may determine, from a first acknowledgement data 164, that a second server 130 has received a first message 160 from a first server 130. In another example, the detection engine 144 may determine, from a second acknowledgement data 164, that the second server 130 has reported an exception error 106 that indicates the second server 130 did not receive the second message 160 from the third server 130, and that the third server 130 did not send the second message 160 to the second server 130. If the detection engine 144 determines that at least one server 130 reports an exception error 106, method 300 proceeds to step 308. Otherwise, method 300 terminates.

At step 308, the detection engine 144 (e.g., via the multi-layer detection module 154) identifies one or more servers 130 that are directly interacting with the server 130 that reported the exception error 106. For example, the detection engine 144 identifies one or more servers 130 that send and/or receive messages 160 to and/or from the server 130 that reported the exception error 106.

At step 310, the detection engine 144 (e.g., via the multi-layer detection module 154) identifies one or more failed message 160 that is not received by a respective server 130 from among the one or more servers 130. In this process, the multi-layer detection module 154 executes query statements to identify the successful and failed messages 160, similar to that described in FIGS. 1 and 2. The failed messages 160 may be referred to the messages 160 that were not sent and/or received.

At step 312, the detection engine 144 identifies a particular server 130 from among the one or more servers 130 that is associated with the earliest failed message 160. For example, the detection engine 144 may generate the communication matrix 166, and identify the particular server 130 that is associated with the earliest failed message 160, similar to that described in FIGS. 1 and 2.

At step 314, the detection engine 144 determines that the particular server 130 is associated with a root cause 108 of the exception error 106, similar to that described in FIGS. 1 and 2.

Example Solution Monitoring System

Figure 4:
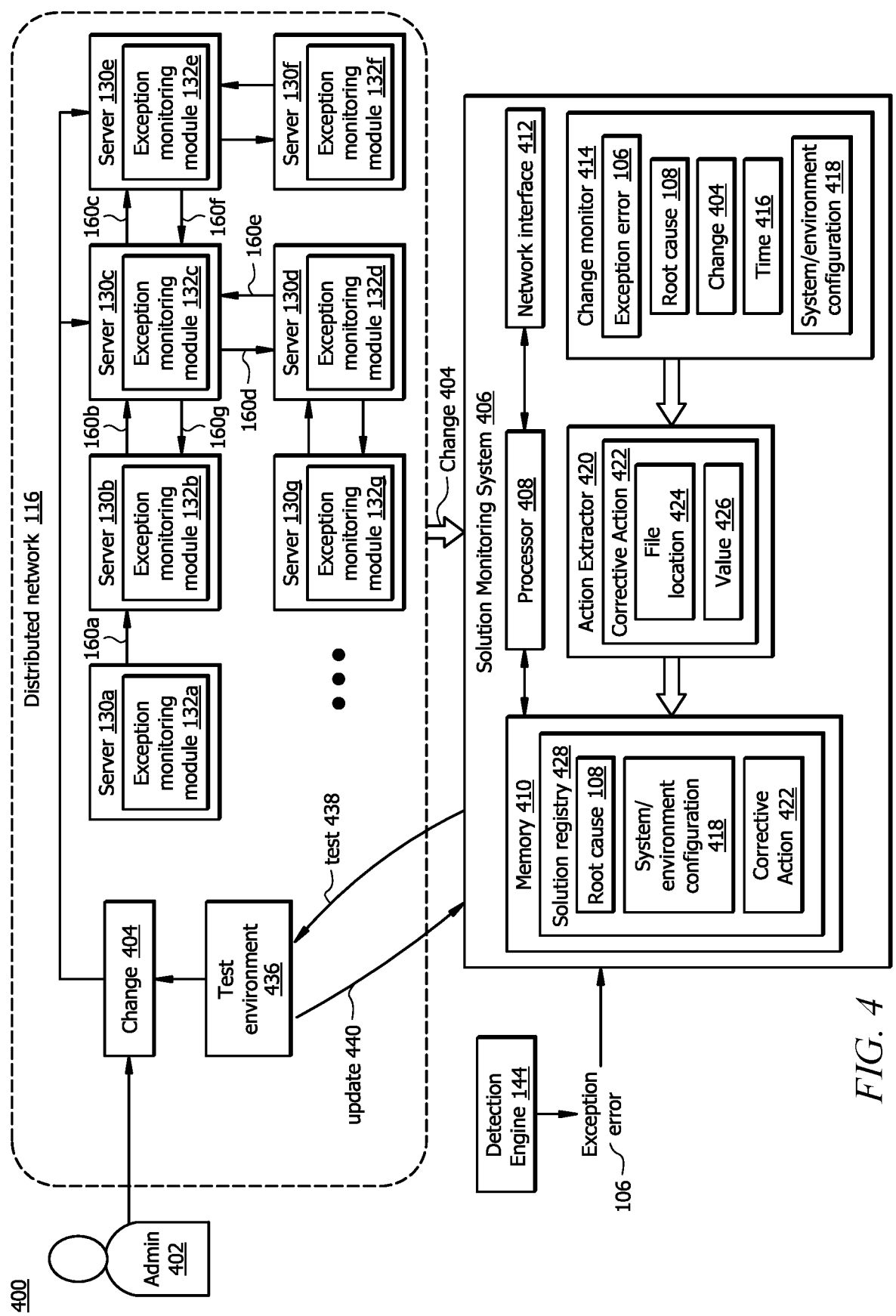
FIG. 4 is a diagram illustrating a system configured to monitor corrective actions taken in response to detected exception errors and generate a solution registry.

As described above, previous technology fails to provide reliable and efficient tools for correcting an exception error 106. FIG. 4 illustrates a system 400 for generating a solution registry 428 that stores corrective actions 422 for different error root causes 108 which can be used to more efficiently and reliably correct exception errors 106 at future times. The system 400 includes a distributed network 116 (e.g., the same as or similar to that described with respect to FIG. 1 above) and a solution monitoring system 406.

The solution monitoring system 406 generally monitors messages 160 communicated between/amongst the servers 130 of the distributed network 116 and detects when an exception error 106 is detected (e.g., as described above with respect to FIGS. 1-3 or through another appropriate approach). The solution monitoring system 406 reviews different layers of information associated with operation of and configuration of the distributed network 116 to determine the most probable source of the exception error (e.g., the root cause 108, as described above with respect to FIGS. 1-3). Over time, the solution monitoring system monitors changes 404 implemented to correct exception errors 106 and uses the information obtained to generate a solution registry 428 with corrective actions 422, which can be automatically implemented to resolve future exception errors 106. While the solution monitoring system 406 is shown as a separate system, it should be understood that the solution monitoring system 406 may be implemented using the central server 140 of FIG. 1, the solution implementation system 604 of FIG. 6, and/or the exception resolution containerization system 806 of FIG. 8. In other words, a combined system may be operable to perform all or a portion of the functions of the central server 140 described with respect to FIGS. 1-3, the solution monitoring system 406 described with respect to FIGS. 4 and 5, the solution implementation system 604 described with respect to FIGS. 6 and 7, and/or the exception resolution containerization system 806 described with respect to FIGS. 8 and 9.

The solution monitoring system 406 determines when an exception error 106 is detected. The detection of an exception error 106 and the determination of a corresponding root cause 108 is described in greater detail above with respect to the detection engine 144 of FIGS. 1 and 2. However, in brief, the detection engine 144 (e.g., whether implemented by the solution monitoring system 406 itself or the central server 140 described with respect to FIGS. 1-3 above) determines the system logs involved in communications between servers 130 and queries whether a successful interface is established between servers 130 that are intended to be in communication. This information is then used to determine a probability matrix (see, e.g., communication matrix 166 of FIG. 2 and the corresponding description above) to determine the most probable root cause 108 or failed server 130 for the given message 160 in the distributed network 116.

Figure 8:
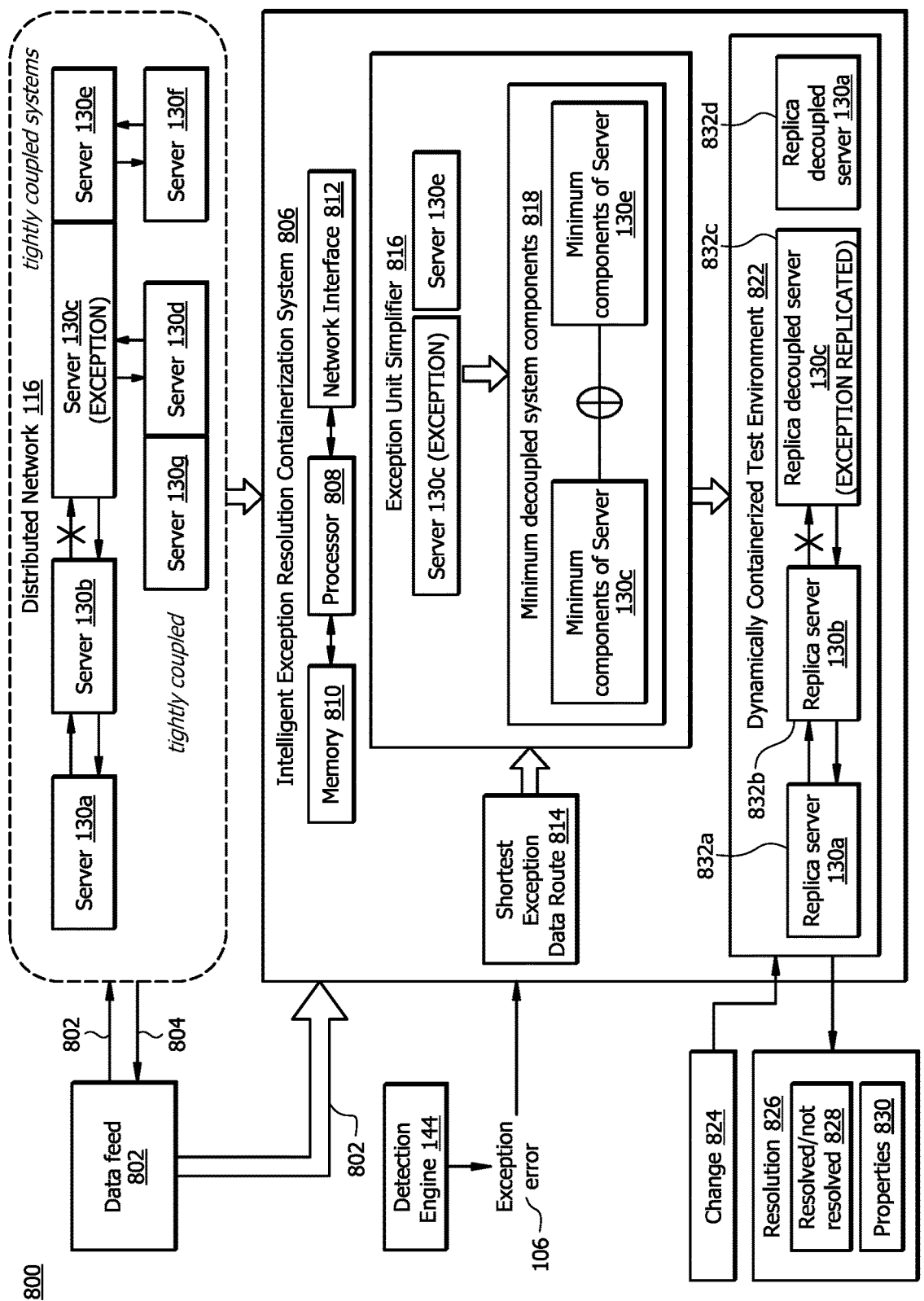
FIG. 8 is a diagram illustrating a system configured to provide an improved containerized test environment for resolving exception errors.

After the exception error 106 is detected, the solution monitoring system 406 monitors the messages 160 and the exception error 106 over time. At some time, a change 404 is provided to the distributed network 116 to correct the exception error 106. The change 404 may be provided by an administrator 402. In some cases, the change 404 may be determined at least in part using a test environment 436. For example, the test environment 436 may provide a hardware- and/or software-based replica of the distributed network (see containerized test environment 822 of FIG. 8), such that the impact of a change 404 on network functionality can be assessed before a change to the actual distributed network 116 is implemented. FIG. 8 illustrates an improved test environment 822 that may be employed in certain embodiments as test environment 436. In some cases, the test environment 436 may also or alternatively be employed downstream in the process of determining corrective actions 422 for future times. For example, the test environment 436 may be used to test 438 and update 440 corrective actions 422 that have already been determined. In this way, corrective actions 422 can be refined over time to account for changes to the distributed network 116 or other advancements in the handling of exception errors 106.

The change 404 is detected by a change monitor 414 that detects changes 404 across the servers 130 of the distributed network 116. The change monitor 414 captures any change 404 introduced to the distributed network 116 to resolve an exception error 106. Changes 404 may be detected based on changes to the hardware and/or software (e.g., as changes to entries in code or applications of the servers 130). The change monitor 414 may validate a change 404 after messages 160 are re-transmitted through the distributed network 116 to ensure the exception error 106 is resolved. Changes 404 may include changes that have been tested in the test environment 436. Each change 404 may be associated with a time 416 at which the change 404 was tested or implemented as well as a system or environment configuration 418, which describes the configuration of the distributed network 116 at the time 416 of the change 404. For example, the system/environment configuration 418 may indicate how the various servers 130 are interconnected to be communicatively connected (e.g., server 130a communicates directly to server 130b but not to servers 130c-g) and/or the functions performed by the various servers 130 (e.g., analyzing, filtering, storing messages 160). In some cases, the system/environment configuration 418 may also or alternatively indicate properties of the message 160 (e.g., because different messages 160 or types of messages 160 may be associated with different types of exception errors 106 and be resolved with different types of changes 404).

An action extractor 420 reviews the one or more changes 404 that may have been tested and/or introduced for the exception error 106 and determines an appropriate corrective action 422 for the exception error 106 and its root cause 108. The corrective action 422 may be an executable command that implements the change 404 that most effectively solved the exception error 106 (e.g., the change 404 that was implemented in the distributed network and validated as resolving the exception error 106). For example, the corrective action 422 may indicate a file location 424 in a server 130 where a change is made to resolve the exception error 106 and a value 426 that is added, changed, or removed in the file location 424 to resolve the exception error 106. As an example, the value 426 may correspond to a communication timing between servers 130 of the distributed network 116. For example, the value 426 may indicate a delay time between receiving and sending message 160. In some cases, the value 426 may indicate which server 130 should receive the message 160. The value 426 is provided in code or a configuration file associated with the file location 424, which may be associated the communication configuration settings of the server 130.

The determined corrective action 422 is then stored in the solution registry 428. The solution registry 428 may be a database or any appropriately structured repository of information. The corrective action 422 may be stored in a manner such that it is associated or linked with the root cause 108 of the exception error 106 and the system/environment configuration 418. The corrective actions 422 can be implemented in the future to effectively self-repair the distributed network 116, as described in greater detail below with respect to the solution implementation system of FIGS. 6 and 7. In some embodiments, functions of the solution implementation system 604 of FIGS. 6 and 7 may be implemented by the solution monitoring system 406. In other words, the same system may perform the functions of the solution monitoring system 406 and the solution implementation system 604.

As illustrated in FIG. 4, the solution monitoring system 406 includes a processor 408, memory 410, and network interface 412. Processor 408 may be the same as or similar to processor 142 described above with respect to FIG. 1. Processor 408 comprises one or more processors operably coupled to the memory 410 and network interface 412. The processor 408 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 408 may be a programmable logic device, a microcontroller, a microprocessor, or any suitable combination of the preceding. The one or more processors are configured to process data and may be implemented in hardware or software. For example, the processor 408 may be 8-bit, 16-bit, 32-bit, 64-bit, or of any other suitable architecture. The processor 408 may include an arithmetic logic unit (ALU) for performing arithmetic and logic operations, processor 408 registers the supply operands to the ALU and store the results of ALU operations, and a control unit that fetches instructions from memory and executes them by directing the coordinated operations of the ALU, registers and other components. The one or more processors are configured to implement various instructions (e.g., to implement operations of the change monitor 414 and action extractor 420, described above). In this way, processor 408 may be a component of a special-purpose computer designed to implement the functions disclosed herein. In an embodiment, the processor 408 is implemented using logic units, FPGAs, ASICs, DSPs, or any other suitable hardware.

Network interface 412 is configured to enable wired and/or wireless communications (e.g., via network 110 of FIG. 1). The network interface 412 is configured to communicate data between the solution monitoring system 406 and other devices, databases, systems, or domains. For example, the network interface 412 may comprise a WIFI interface, a local area network (LAN) interface, a wide area network (WAN) interface, a modem, a switch, or a router. The processor 408 is configured to send and receive data using the network interface 412. The network interface 412 may be configured to use any suitable type of communication protocol as would be appreciated by one of ordinary skill in the art.

Memory 410 may be volatile or non-volatile and may comprise a read-only memory (ROM), random-access memory (RAM), ternary content-addressable memory (TCAM), dynamic random-access memory (DRAM), and static random-access memory (SRAM). Memory 410 may be implemented using one or more disks, tape drives, solid-state drives, and/or the like. Memory 410 is operable to store the solution registry 428, other items associated with the change monitor 414 and action extractor 420, and/or any other suitable set of instructions, logic, rules, or code operable by the processor 408 to achieve the functions described herein.

Example Method of Operating a Solution Monitoring System

Figure 5:
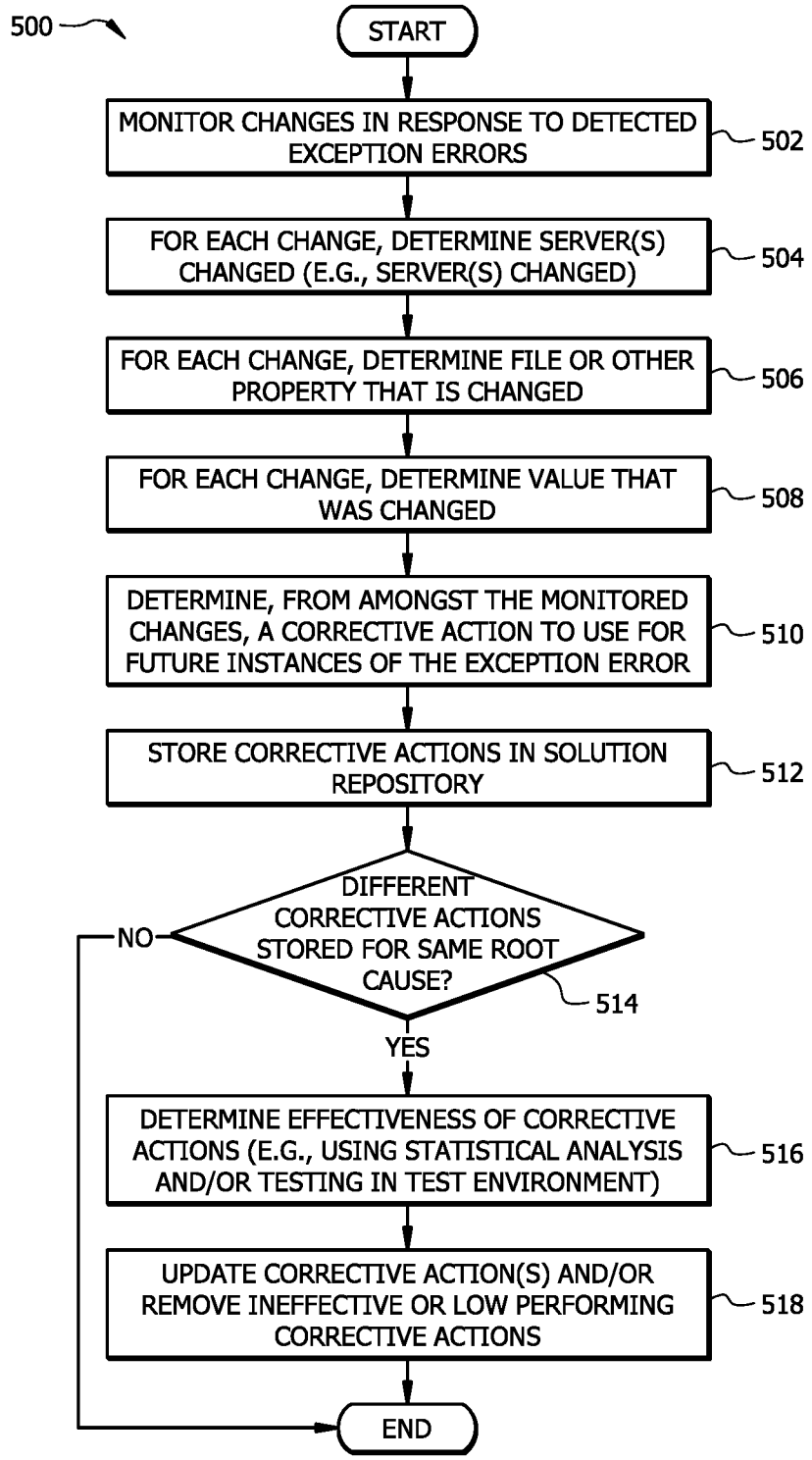
FIG. 5 is a flowchart illustrating an example operation of the system of FIG. 4.

FIG. 5 shows an example method 500 of operating the solution monitoring system 406 of FIG. 4. The method 500 may be implemented using the processor 408, memory 410, and network interface 412 of the solution monitoring system 406. The method 500 may begin at step 502 where the solution monitoring system 406 monitors changes 404 implemented and/or tested to resolve a detected exception error 106. At step 504, the solution monitoring system 406 determines which server(s) 130 are impacted by each change 404 (e.g., in which server(s) 130 of the distributed network 116 a change 404 was tested and/or implemented). The solution monitoring system 406 may also determine the system/environment configuration 418, as described above with respect to the example of FIG. 4. At step 506, the solution monitoring system 406 determines the file location 424 (or other property) that was altered by each change 404. At step 508, the solution monitoring system 406 determines the value 426 changed at the file location 424, as described above with respect to FIG. 4. Steps 502-508 may correspond to operations performed by the change monitor 414 in the example of FIG. 4.

At step 510, a corrective action 422 is determined for resolving future instances of the detected exception error 106. For example, the corrective action 422 may be an executable command that implements the change 404 that most effectively solved the exception error 106 (e.g., the change 404 that was implemented in the distributed network and validated as resolving the exception error 106). For example, the corrective action 422 may indicate a file location 424 (from step 506) in a server 130 where a change is made to resolve the exception error 106 and a value 426 (from step 508) that is added, changed, or removed in the file location 424 to resolve the exception error 106. At step 512, the determined corrective action 422 is stored in the solution registry 428.

In some embodiments, steps 514-518 may be performed to manage and/or update the corrective actions 422 stored in the solution registry 428. For example, at step 514, the solution monitoring system 406 may determine whether there are multiple corrective actions 422 stored for the same root cause 108 and/or system/environment configuration 418. If this is the case, the solution monitoring system 406 proceeds to step 516, where the corrective actions 422 are evaluated further. For example, the corrective actions 422 may be tested using the test environment 436 or otherwise analyzed to determine the effectiveness of the corrective actions 422 over time at resolving exception errors 106 (e.g., using statistical analysis). At step 518, the solution monitoring system 406 may update 440 corrective action(s) 422 and/or remove low performing corrective action(s) 422. In this way, the solution registry 428 may be continuously improved over time, resulting in further improved operation of the servers 130 of the distributed network 116.

Example Solution Implementation System

Figure 6:
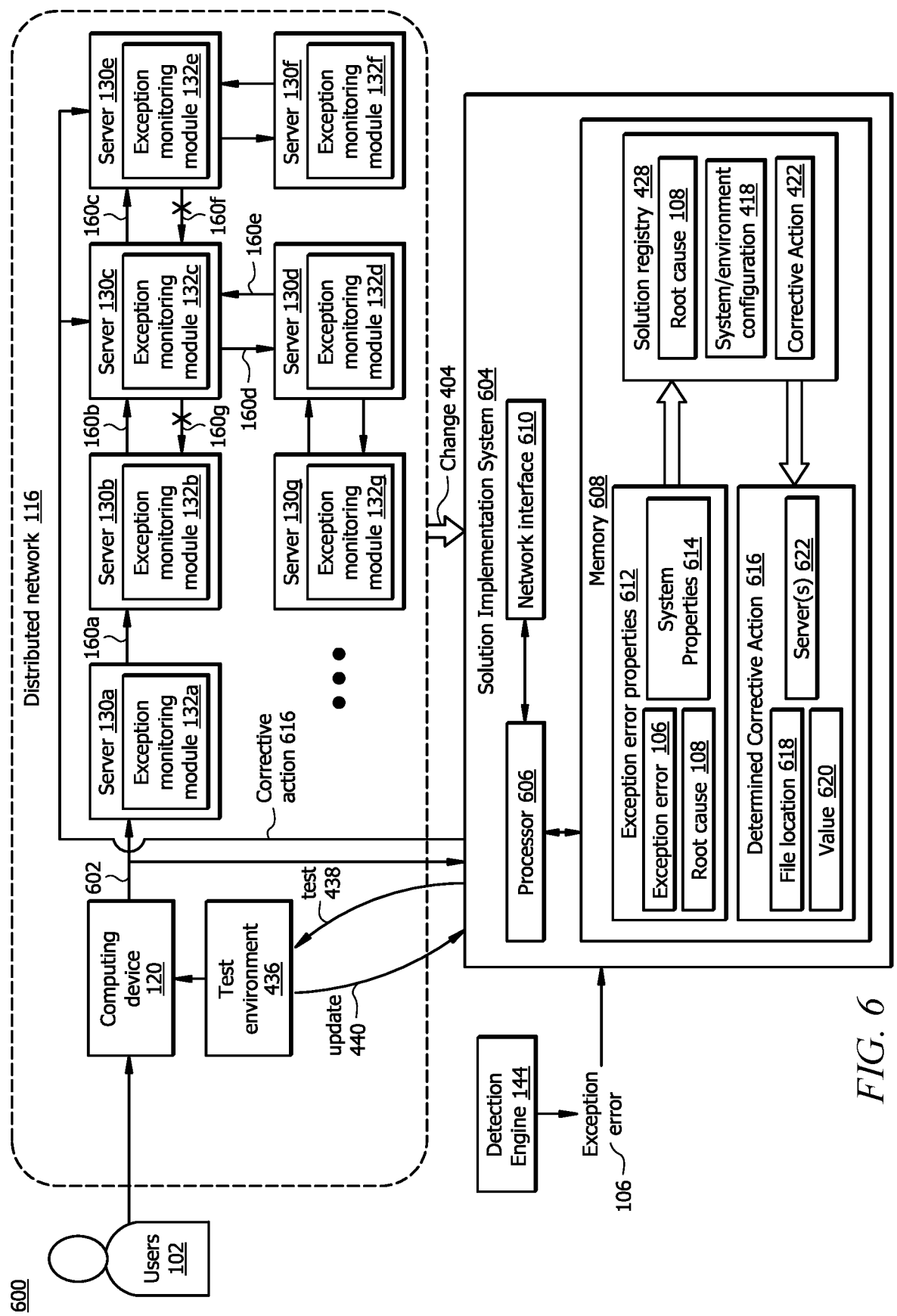
FIG. 6 is a diagram illustrating a system configured to automatically implement corrective actions in response to detected exception errors.

Once corrective actions 422 are identified for resolving exception errors 106, whether as described above with respect to FIGS. 4 and 5 or using any other appropriate approach, this disclosure also provides for the automatic implementation of the corrective actions 422 when an exception error 106 is detected. In this way, exception errors 106 can be resolved automatically and in near real-time, such that there is little downtime during which a distributed network 116 is unavailable. FIG. 6 illustrates an example system 600 for automatically implementing a determined corrective action 616 (e.g., selected from predetermined corrective actions 422) for resolving a detected exception error 106. The system 600 includes the distributed network 116 and a solution implementation system 604. The solution implementation system 604 receives communication data 602 sent to the servers 130 of the distributed network and determines when an exception error 106 is detected (e.g., as described above with respect to FIGS. 1-6). Exception error properties 612 are determined and used to determine a corrective action 616 from the predetermined corrective actions 422 stored in solution registry 428. The determined corrective action 616 is then automatically implemented (e.g., by changing a value 620 at a file location 618 of one or more servers 622 impacted by the exception error 106), thereby effectively self-correcting the distributed network 116.

In the example of FIG. 6, an exception error 106 is detected that is associated with a failure to send messages 160f and 160g. The solution implementation system 604 may receive the detected exception error 106 from the detection engine 144 described above with respect to FIG. 1. In some embodiments, the solution implementation system 604 may perform all or a portion of the functions of the central server 140 of FIG. 1 (e.g., including but not limited to functions of the detection engine 144 for detecting an exception error 106). The root cause 108 of the exception error 106 may be determined as described with respect to FIGS. 1-3 above. In the example of FIG. 6, the root cause 108 may be determined to be server 130e which failed to send message 160f to server 130c.

The solution implementation system 604 may also determine system properties 614 associated with the configuration of the distributed network 116 when the exception error 106 is detected. For example, the system properties 614 may indicate how the various servers 130 are communicatively connected (e.g., server 130a communicates directly to server 130b but not to servers 130c-g) and/or the functions performed by the various servers 130 (e.g., analyzing, filtering, storing messages 160). In some cases, the system properties 614 may also or alternatively indicate properties of the message 160 (e.g., because different messages 160 or types of messages 160 may be associated with different types of exception errors 106 and be resolved with different types of changes 404). The system properties 614 may indicate the servers 130 impacted by the exception error 106. For instance, for the example of FIG. 6, the impacted servers 130 may be servers 130b, 130c and 130e. The system properties 614 may be similar to the system/environment configurations 418 described above with respect to FIGS. 4 and 5 but are determined with respect to a detected exception error 106 rather than a change 404 to resolve an exception error 106.

The solution implementation system 604 then determines whether a predefined corrective action 422 is available for resolving the root cause 108 of the exception error 106. For example, the solution implementation system 604 may determine if there is a corrective action 422 with the same root cause 108 as the detected exception error 106 and for a system/environment configuration 418 that is at least within a threshold similarity to the system properties 614. Such a corrective action 422 is identified as a determined corrective action 616. The determined corrective action 616 may indicate one or more servers 622 of the servers 130 for which a change should be implemented. For example, a value 620 may be changed at a file location 618 of each of the servers 622. The value 620 may be changed to adjust a communication timing of the server(s) 622 with other of the servers 130.

In some cases, the corrective action 616 may be automatically implemented at the distributed network 116 (e.g., by implementing change in value 620 at file location 618 of the impacted servers 130e and/or 130f in the example of FIG. 6). For example, the corrective action 616 may be automatically implemented if the root cause 108 and system properties 614 of the exception error properties 612 are a good match (e.g., within a threshold value or greater) with the root cause 108 and system/environment configuration 418 of the solution registry 428. In other cases, the determined corrective action 616 may be tested and/or updated using a test environment 436, as described, e.g., with respect to FIG. 4, prior to implementation of the corrective action 616. Automatic implementation of a corrective action 616 allows the distributed network 116 to be automatically repaired without extended downtimes or excessive consumption of computing resources to identify new solutions.

As illustrated in FIG. 6, the solution implementation system 604 includes a processor 606, memory 608, and network interface 610. Processor 606 may be the same as or similar to processor 142 and/or 408 described above with respect to FIGS. 1 and 4 above. Processor 606 comprises one or more processors operably coupled to the memory 608 and network interface 610. The processor 606 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 606 may be a programmable logic device, a microcontroller, a microprocessor, or any suitable combination of the preceding. The one or more processors are configured to process data and may be implemented in hardware or software. For example, the processor 606 may be 8-bit, 16-bit, 32-bit, 64-bit, or of any other suitable architecture. The processor 606 may include an arithmetic logic unit (ALU) for performing arithmetic and logic operations, processor 606 registers the supply operands to the ALU and store the results of ALU operations, and a control unit that fetches instructions from memory and executes them by directing the coordinated operations of the ALU, registers and other components. The one or more processors are configured to implement various instructions. In this way, processor 606 may be a component of a special-purpose computer designed to implement the functions disclosed herein. In an embodiment, the processor 606 is implemented using logic units, FPGAs, ASICs, DSPs, or any other suitable hardware.

Network interface 610 is configured to enable wired and/or wireless communications (e.g., via network 110 of FIG. 1). The network interface 610 is configured to communicate data between the solution implementation system 604 and other devices, databases, systems, or domains. For example, the network interface 610 may comprise a WIFI interface, a local area network (LAN) interface, a wide area network (WAN) interface, a modem, a switch, or a router. The processor 606 is configured to send and receive data using the network interface 610. The network interface 610 may be configured to use any suitable type of communication protocol as would be appreciated by one of ordinary skill in the art.

Memory 608 may be volatile or non-volatile and may comprise a read-only memory (ROM), random-access memory (RAM), ternary content-addressable memory (TCAM), dynamic random-access memory (DRAM), and static random-access memory (SRAM). Memory 608 may be implemented using one or more disks, tape drives, solid-state drives, and/or the like. Memory 608 is operable to store exception error properties 612, determined corrective action 616, the solution registry 428, and/or any other suitable set of instructions, logic, rules, or code operable by the processor 606 to achieve the functions described herein.

Example Method of Operating a Solution Implementation System

Figure 7:
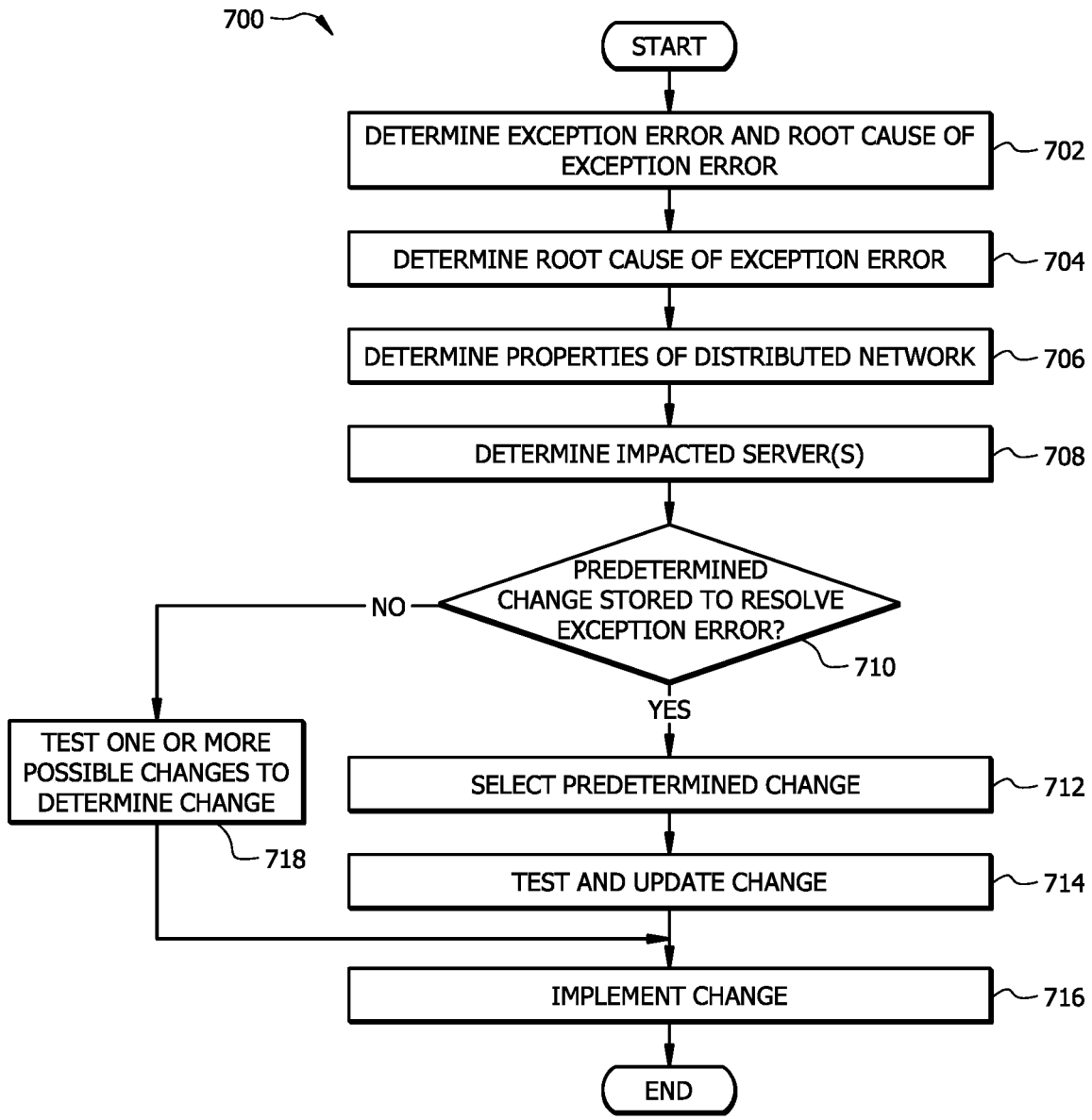
FIG. 7 is a flowchart illustrating an example operation of the system of FIG. 6.

FIG. 7 shows an example method 700 of operating the solution implementation system 604 of FIG. 6. The method 700 may be implemented using the processor 606, memory 608, and network interface 610 of the solution implementation system 604. The method 700 may begin at step 702 where the solution implementation system 604 determines that an exception error 106 is detected. For example, an exception error 106 may correspond to a failed message 160 between one or more servers 130 of the distributed network 116 (see, e.g., failed messages 160f and 160g in the example of FIG. 6). At step 704, the solution implementation system 604 determines root cause 108 of the exception error 106, as also described with respect to FIGS. 1-3 above.

At step 706, system properties 614 are determined. For example, the system properties 614 may indicate how the various servers 130 are interconnected (e.g., server 130a communicates directly to server 130b but not to servers 130c-g) and/or the functions performed by the various servers 130 (e.g., analyzing, filtering, storing messages 160). In some cases, the system properties 614 may also or alternatively indicate properties of the message 160 (e.g., because different messages 160 or types of messages 160 may be associated with different types of exception errors 106 and be resolved with different types of changes 404). The system properties 614 may indicate the servers 130 impacted by the exception error 106. For instance, for the example of FIG. 6, the impacted servers 130 may be servers 130b, 130c and 130e. At step 708, the server(s) 622 impacted by the exception error 106 are determined (e.g., based at least in part on the system properties 614). For the example of FIG. 6, the impacted servers 622 may be servers 130b, 130c and 130e.

At step 710, the solution implementation system 604 determines whether a predetermined corrective action 422 is available for the exception error 106 (e.g., that matches within a threshold the root cause 108 and system properties 614). If a corrective action 422 is available, the solution implementation system 604 proceeds to step 712. Otherwise, the solution implementation system 604 may proceed to step 718.

At step 712, the solution implementation system 604 selects the predetermined corrective action 422 to use as the determined corrective action 616. At step 714, the solution implementation system 604 may test 438 and/or update 440 the corrective action 616 using the test environment 436. In some cases, the improved containerized test environment 822 described with respect to FIGS. 8 and 9 as the test environment 436 to facilitate improved testing and updating of the corrective action 616 at near real-time. At step 716, the solution implementation system 604 automatically implements the corrective action 616 (e.g., by changing a value 620 at a file location 618 of the impacted servers 622, as illustrated in the example of FIG. 6).

For cases where a predefined corrective action 422 is not available at step 710, the solution implementation system 604 may use the test environment 436 to determine a corrective action 616 at step 718. This corrective action 616 is then implemented as described above at step 716. For example, as illustrated in FIG. 8 below, one or more changes 824 may be tested to determine whether the change 824 is likely to resolve the exception error 106. In some cases, the improved test environment of FIGS. 8 and 9 may be employed at step 718 to efficiently determine the corrective action 616 in near real-time.

Example Improved Test Environment

As described briefly above, in some embodiments, the test environments 436 employed in systems 400 and 600 may be improved to facilitate more efficient and reliable testing of solutions to exception errors 106. FIG. 8 illustrates an example of a system 800 for implementing improved test environments 822 using an intelligent exception resolution containerization system 806. Previously, a great deal of time and resources were consumed to generate a test environment to test an issue occurring in a production environment, such as distributed network 116. For example, real-world systems (e.g., exemplified by the configurations and operations of servers 130 of FIGS. 1, 2, 4, and 6 described above) may be too complex to be reliably recreated to evaluate exception error scenarios, such that a test environment 436 operated using previous technology may not be able to implemented for certain exception errors 106. Moreover, even when previous technology can be used to provide a test environment 436, the components of the test environment may be too complex for sufficiently rapid testing and may require more computational resources than are reasonably available for testing.

The intelligent exception resolution containerization system 806 of FIG. 8 provides improvements to previous technology and solves problems of previous technology, including those described above. In general, the intelligent exception resolution containerization system 806 determines the servers 130 involved in an exception error 106 (e.g., those servers 130 involved in the failed data flow on an exception error 106) and generates a dynamically containerized test environment 822 (e.g., corresponding to a test environment 436 of FIGS. 4 and 6) that includes the fewest required replica components 832*a-d* for recreating an exception error 106 and validating/testing possible solutions. In some embodiments (e.g., because of improvements to the efficiency with which computational resources are used), the containerized test environment 822 can be generated in near real-time to provide rapid evaluation of solutions to exception errors 106, such that they can be implemented with very little system downtime after an exception error 106 is detected.

The system 800 of FIG. 8 includes a distributed network 116 and the intelligent exception resolution containerization system 806. The intelligent exception resolution containerization system 806 may be implemented as a separate system using processor 808, memory 810, and network interface 812 or as part of one or more of the systems described above, including, the central server 140 of FIG. 1, the solution monitoring system 406 of FIG. 4, and/or the solution implementation system 604 of FIG. 6.

The distributed network 116 receives a communication data feed 802. The data feed 802 may include messages 160 illustrated in FIGS. 2, 4, and 6 and described above. For example, communications data feed 802 may include a request for information stored in one or more of the servers 130. Communication amongst the servers 130, as illustrated in FIG. 8, allows the appropriate information to be obtained and provided back as communication data 804, which may include a response to the request. In the example of FIG. 8, the distributed network 116 includes a number of servers 130, which may be the same as or similar to those described above with respect to FIGS. 1, 2, 4, and 6. FIG. 8 further illustrates that certain of the servers 130 are tightly coupled. For example, servers 130*c* and 130*e* are tightly coupled, and servers 130*g* and 130*d* are tightly coupled. Tightly coupled servers 130 are those for which operations performed by the separate systems are inter-related and conventionally difficult to separate. For example, an output of an operation performed by server 130*c* may be used as an input at tightly coupled server 130*e* and vice versa.

The new intelligent exception resolution containerization system 806 of this disclosure is able to more efficiently replicate operations of tightly coupled servers 130 by identifying the shortest data route 814 associated with an exception and using this information to generate a dynamically containerized test environment 822 based on the minimum system components 818 needed for testing resolutions to the exception error 106. When an exception error 106 is detected (e.g., by the detection engine 144 described above with respect to FIGS. 1 and 2), the intelligent exception resolution containerization system 806 determines a dynamically containerized test environment 822 that can be used to test potential changes 824 for resolving the exception error 106.

The intelligent exception resolution containerization system 806 determines the shortest data transfer route 814 for the exception error 106. The shortest data transfer route 814 is the portion of the servers 130 that is associated with failed transmission of the communication data 802, 804 because of the exception error 106. The intelligent exception resolution containerization system 806 generally tracks the route of the communication data 802, 804 involved in the exception error 106 and determines the shortest data transfer route 814 for exception replication. The shortest data transfer route 814 includes the servers 130 of the distributed network 116 that fail to transmit or receive the communication data 802, 804 as a result of the exception error 106. In the example scenario illustrated in FIG. 8, the shortest data transfer route 814 includes server 130*a*, server 130*b*, and tightly coupled servers 130*c* and 130*e*. The shortest data transfer route 814 may exclude other servers 130*g*, 130*d*, and 130*f* that are not associated with the path of communication data 802, 804 impacted by the exception error 106.

The intelligent exception resolution containerization system 806 includes an exception unit simplifier 816 (e.g., implemented by the processor 808) that determines minimum decoupled system components 818 for any tightly coupled servers 130 that may be involved with a detected exception error 106. In the example scenario of FIG. 8, tightly coupled servers 130*c* and 130*e* are identified in the shortest data transfer route 814. The exception unit simplifier 816 extracts the fewest required system components 818 of the tightly coupled servers 130*c* and 130*e* that are needed to support replication of the exception error 106. In other words, a subset of the components of the tightly coupled servers 130*c* and 130*e* are identified as the minimum components to include in the containerized test environment 822.

The exception resolution containerization system 806 then generates the dynamically containerized test environment 822. The containerized test environment 822 may be used as test environment 436 of FIGS. 4 and/or 6. The containerized test environment 822 is generated based at least in part on the shortest data transfer route 814 and the minimum system components 818. The containerized test environment 822 includes replica components 832*a-d* for the servers 130*a, b* included in the shortest data transfer route 814 and the minimum system components 818 of the tightly coupled servers 130*c* and 130*e*. In other words, the containerized test environment 822 includes only those elements needed to replicate the exception error 106 and test potential solutions while excluding replica components for servers 130*g*, 130*d*, and 130*f* that are not in the shortest data transfer route 814. This approach allows the containerized test environment 822 to be executed without wasting computational resources to replicate operations of servers 130 that are not involved in the exception error 106.

Once the containerized test environment 822 is generated, it can be used to evaluate potential changes 824 for resolving the exception error 106. A change 824 may be an alteration or modification to a property of one or more of the replica components 832a-d of the containerized test environment 322. For example, a change 824 may be made to a property of the replica component 832c corresponding to server 130c experiencing the exception error 106. The change 824 may be to a data transfer configuration property of the server 130c corresponding to replica component 832c. The property altered by change 824 may correspond to a value 426, 620 at a file location 424, 618, as described with respect to FIGS. 4-7 above. For example, the data configuration property altered by change 824 may be a connection timing parameter for communications between servers 130.

A resolution 826 is determined for each change 824 that is tested. The resolution 826 includes a resolved/not resolved indication 828 and the properties 830 altered during the test of change 824. The resolved/not resolved indication 828 indicates whether the change 824 resolved the exception error 106. The properties 830 are the one or more properties modified by the change 824, as described above. A preferred resolution 826 may be one that is determined for the change 824 that corrected the failed communication within the containerized test environment 822. For example, a change 824 that enables communication between replica components 132a-d may be selected as the resolution 826. In some embodiments, this resolution 826 (i.e., that corrects the exception error 106 in the containerized test environment 822) is automatically implemented, as described above with respect to the solution implementation system 604 with respect to FIGS. 6 and 7. Automatically implementing the resolution 826 (e.g., the successful change 824) allows transmission of the communication data 802, 804 through the servers 130 of the distributed network 116.

In some cases, the resolution 826 (e.g., or the corresponding change 824 identified as a successful resolution 826) may be stored in the solution registry 428 described above with respect to FIGS. 4-7. Accordingly, at future times, a subsequent exception error 106 can be detected and the stored resolution 826 can be used to correct the subsequent exception error 106. In this way, the resolutions 826 determined using the more efficient and reliable containerized test environment 822 can be identified as a solution to newly encountered exception errors 106 and automatically implemented with little or no downtime for users of the distributed network 116.

As illustrated in FIG. 8, the exception resolution containerization system 806 includes a processor 808, memory 810, and network interface 812. Processor 808 may be the same as or similar to processor 142, 408, and/or 606 described above with respect to FIGS. 1, 4, and 6 above. Processor 808 comprises one or more processors operably coupled to the memory 810 and network interface 812. The processor 808 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 808 may be a programmable logic device, a microcontroller, a microprocessor, or any suitable combination of the preceding. The one or more processors are configured to process data and may be implemented in hardware or software. For example, the processor 808 may be 8-bit, 16-bit, 32-bit, 64-bit, or of any other suitable architecture. The processor 808 may include an arithmetic logic unit (ALU) for performing arithmetic and logic operations, processor 808 registers the supply operands to the ALU and store the results of ALU operations, and a control unit that fetches instructions from memory and executes them by directing the coordinated operations of the ALU, registers and other components. The one or more processors are configured to implement various instructions. In this way, processor 808 may be a component of a special-purpose computer designed to implement the functions disclosed herein. In an embodiment, the processor 808 is implemented using logic units, FPGAs, ASICs, DSPs, or any other suitable hardware.

Network interface 812 is configured to enable wired and/or wireless communications (e.g., via network 110 of FIG. 1). The network interface 812 is configured to communicate data between the exception resolution containerization system 806 and other devices, databases, systems, or domains. For example, the network interface 812 may comprise a WIFI interface, a local area network (LAN) interface, a wide area network (WAN) interface, a modem, a switch, or a router. The processor 808 is configured to send and receive data using the network interface 812. The network interface 812 may be configured to use any suitable type of communication protocol as would be appreciated by one of ordinary skill in the art.

Memory 810 may be volatile or non-volatile and may comprise a read-only memory (ROM), random-access memory (RAM), ternary content-addressable memory (TCAM), dynamic random-access memory (DRAM), and static random-access memory (SRAM). Memory 810 may be implemented using one or more disks, tape drives, solid-state drives, and/or the like. Memory 810 is operable to store any suitable set of instructions, logic, rules, or code operable by the processor 808 to achieve the functions described herein.

Example Method of Operating an Improved Test Environment

Figure 9:
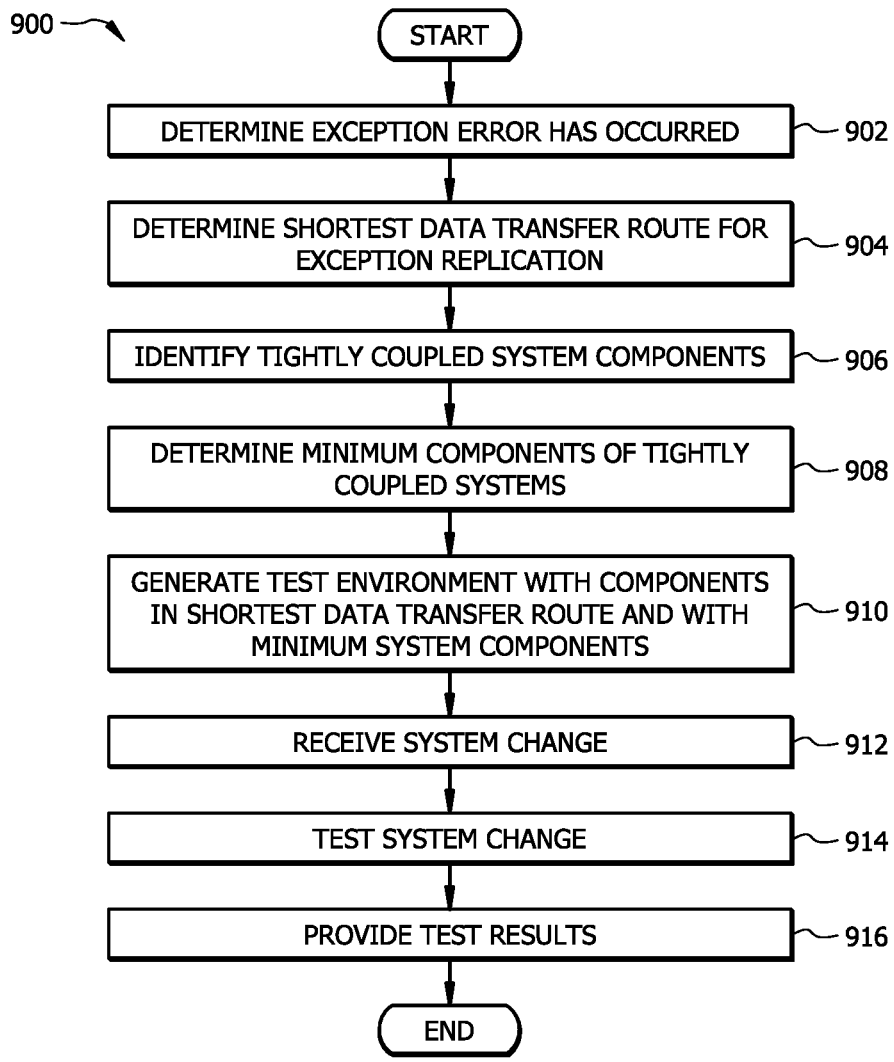
FIG. 9 is a flowchart illustrating an example operation of the system of FIG. 8.

FIG. 9 shows an example method 900 for providing a containerized test environment 822. The method 900 may be implemented using the processor 808, memory 810, and network interface 812 of the exception resolution containerization system 806. The method 800 may begin at step 902 where the exception resolution containerization system 806 determines that an exception error 106 is detected. For example, an exception error 106 may correspond to a failed message 160 between one or more servers 130 of the distributed network 116.

At step 904, the exception resolution containerization system 806 determines the shortest data transfer route 814, which is the portion of the servers 130 that are associated with failed transmission of the communication data 802, 804 because of the exception error 106. The exception resolution containerization system 806 may determine the shortest data transfer route 814 by tracking the route of the communication data 802, 804 involved in the exception error 106 and determining the shortest data transfer route 814 for exception replication.

At step 906, the exception resolution containerization system 806 identifies any tightly coupled servers 130 that are within the shortest data transfer route 814. Tightly coupled servers 130 are those for which operations performed by the separate systems are inter-related and conventionally difficult to separate. For example, an output of an operation performed by server 130c may be used as an input at tightly coupled server 130e.

At step 908, the exception resolution containerization system 806 determines the minimum system components 818 for exception replication. For example, the exception resolution containerization system 806 may extract the fewest required system components of the tightly coupled servers 130c and 130e that are needed to support replication of the exception error 106.

At step 910, the exception resolution containerization system 806 generates the containerized test environment 822. The containerized test environment 822 is generated based at least in part on the shortest data transfer route 814 and the minimum system components 818. The containerized test environment 822 includes replica components 832a-d for the servers 130a, b included in the shortest data transfer route 814 and the minimum system components 818 of the tightly coupled servers 130c and 130e. The containerized test environment 822 may include only those elements needed to replicate the exception error 106 and test potential solutions (e.g., changes 824) while excluding replica components for servers 130g, 130d, and 130f that are not in the shortest data transfer route 814.

At step 912, the exception resolution containerization system 806 receives a change 824 to test as a solution to the exception error 106 replicated in the containerized test environment 822. A change 824 may be an alteration or modification to a property of one or more of the replica components 832a-d of the containerized test environment 322, as described in greater detail above with respect to FIG. 8. At step 914, the change 824 is tested, for example, to determine whether the change 824 results in successful communication between the replica components 832a-d. At step 916 the results of the test are provided, for example, as resolution 826 of FIG. 8. The results may be automatically implemented (see, e.g., FIGS. 6 and 7 and corresponding description above) and/or stored in a solution registry 428 for future use (see, e.g., FIGS. 4 and 5 and corresponding description above).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory and processor communicatively coupled to the memory, wherein the processor is configured to:
determine an exception error is detected corresponding to a failed transmission of a message between communicatively coupled servers of a distributed network;
monitor changes tested and implemented to correct the detected exception errors;
for each monitored change:
determine a root cause of the exception error corrected by the change;
determine properties of the distributed network at the time of the exception error;
determine one or more servers of the distributed network that are impacted by the monitored change;
determine a file location of the one or more servers that are impacted by the monitored change that is altered by the monitored change;
determine a value provided in the determined file location to execute the monitored change;
determine, based at least in part on the determined file location and the determined value, an executable corrective action; and
store, in the memory, the executable action linked to the root cause of the exception error and the properties of the distributed network at the time of the exception error.

2. The system of claim 1, wherein the root cause is determined by detecting that a first server of the distributed network failed to relay a message received from a downstream server.

3. The system of claim 1, wherein the properties of the distributed network at the time of the exception error comprise one or more of an interconnectivity of the servers of the distributed network and functions performed by the servers of the distributed network.

4. The system of claim 1, wherein the value provided in the determined file location to execute the monitored change corresponds to a connection timing parameter for communications between communicatively connected servers of the distributed network.

5. The system of claim 1, wherein the executable corrective action is configured to be automatically implementable to perform the monitored change at a future time.

6. The system of claim 5, wherein the processor is further configured to, after storing the executable action:
detect a subsequent exception error;
determine that the stored executable action resolves the subsequent exception error; and
automatically implement the executable action, thereby automatically resolving the subsequent exception error.

7. The system of claim 5, wherein the system further comprises a test environment configured to test the executable action and determine an update to improve implementation of the executable action at the future time.

8. A method, comprising:
determining an exception error is detected corresponding to a failed transmission of a message between communicatively coupled servers of a distributed network;
monitoring changes tested and implemented to correct the detected exception errors;
for each monitored change:
determining a root cause of the exception error corrected by the change;
determining properties of the distributed network at the time of the exception error;
determining one or more servers of the distributed network that are impacted by the monitored change;

determining a file location of the one or more servers that are impacted by the monitored change that is altered by the monitored change;

determining a value provided in the determined file location to execute the monitored change;

determining, based at least in part on the determined file location and the determined value, an executable corrective action; and storing, in a memory, the executable action linked to the root cause of the exception error and the properties of the distributed network at the time of the exception error.

9. The method of claim 8, wherein determining the root cause comprises detecting that a first server of the distributed network failed to relay a message received from a downstream server.

10. The method of claim 8, wherein the properties of the distributed network at the time of the exception error comprise one or more of an interconnectivity of the servers of the distributed network and functions performed by the servers of the distributed network.

11. The method of claim 8, wherein the value provided in the determined file location to execute the monitored change corresponds to a connection timing parameter for communications between communicatively connected servers of the distributed network.

12. The method of claim 8, wherein the executable corrective action is configured to be automatically implementable to perform the monitored change at a future time.

13. The method of claim 12, further comprising, after storing the executable action:

detecting a subsequent exception error;

determining that the stored executable action resolves the subsequent exception error; and automatically implementing the executable action, thereby automatically resolving the subsequent exception error.

14. The method of claim 12, further comprising:

executing a test environment configured to test the executable action; and determining an update to improve implementation of the executable action at the future time.

15. A computer program comprising executable instructions stored in a non-transitory computer-readable medium that when executed by a processor causes the processor to:

determine an exception error is detected corresponding to a failed transmission of a message between communicatively coupled servers of a distributed network;

monitor changes tested and implemented to correct the detected exception errors;

for each monitored change:

determine a root cause of the exception error corrected by the change;

determine properties of the distributed network at the time of the exception error;

determine one or more servers of the distributed network that are impacted by the monitored change;

determine a file location of the one or more servers that are impacted by the monitored change that is altered by the monitored change;

determine a value provided in the determined file location to execute the monitored change;

determine, based at least in part on the determined file location and the determined value, an executable corrective action; and store, in a memory communicatively coupled to the processor, the executable action linked to the root cause of the exception error and the properties of the distributed network at the time of the exception error.

16. The computer program of claim 15, wherein the root cause is determined by detecting that a first server of the distributed network failed to relay a message received from a downstream server.

17. The computer program of claim 15, wherein the properties of the distributed network at the time of the exception error comprise one or more of an interconnectivity of the servers of the distributed network and functions performed by the servers of the distributed network.

18. The computer program of claim 15, wherein the executable corrective action is configured to be automatically implementable to perform the monitored change at a future time.

19. The computer program of claim 18, wherein the instructions when executed by the processor further cause the processor to, after storing the executable action:

detect a subsequent exception error;

determine that the stored executable action resolves the subsequent exception error; and automatically implement the executable action, thereby automatically resolving the subsequent exception error.

20. The computer program of claim 18, wherein the instructions when executed by the processor further cause the processor to:

execute a test environment configured to test the executable action; and determine an update to improve implementation of the executable action at the future time.

* * * * *